US012696194B2

(12) United States Patent
Morita et al.

(10) Patent No.: US 12,696,194 B2
(45) Date of Patent: Jul. 28, 2026

(54) TRANSMISSION DEVICE, TRANSMISSION METHOD, RELAY DEVICE, RELAY DEVICE CONTROL METHOD, RECEPTION DEVICE, RECEPTION DEVICE CONTROL METHOD, AND NETWORK SYSTEM

(71) Applicant: Sony Group Corporation, Tokyo (JP)

(72) Inventors: Hiroshi Morita, Kanagawa (JP);
Kazuaki Toba, Kanagawa (JP);
Masanari Yamamoto, Kanagawa (JP)

(73) Assignee: SONY GROUP CORPORATION,
Tokyo (JP)

( * ) Notice: Subject to any disclaimer, the term of this patent is extended or adjusted under 35 U.S.C. 154(b) by 728 days.

(21) Appl. No.: 18/016,139

(22) PCT Filed: Aug. 11, 2021

(86) PCT No.: PCT/JP2021/029585
§ 371 (c)(1),
(2) Date: Jan. 13, 2023

(87) PCT Pub. No.: WO2022/039075
PCT Pub. Date: Feb. 24, 2022

(65) Prior Publication Data
US 2023/0276366 A1     Aug. 31, 2023

(30) Foreign Application Priority Data

Aug. 18, 2020   (JP) ................................. 2020-138184
Jun. 17, 2021   (JP) ................................. 2021-100562

(51) Int. Cl.
*H04W 52/02* (2009.01)
*H04W 40/22* (2009.01)

(52) U.S. Cl.
CPC ......... *H04W 52/028* (2013.01); *H04W 40/22* (2013.01)

(58) Field of Classification Search
CPC ... H04W 52/028; H04W 40/22; H04W 52/02; H04W 52/0229; H04W 52/0235;
(Continued)

(56) References Cited

U.S. PATENT DOCUMENTS

2017/0322614 A1    11/2017  Holland
2022/0232449 A1*   7/2022   Di Marco ........... H04W 40/005

FOREIGN PATENT DOCUMENTS

CN        106341468 A      1/2017
CN        110915267 A      3/2020
(Continued)

OTHER PUBLICATIONS

Qualcomm Incorporation, "Support for the signalling of the capability for receiving WUS assistance information" 3GPP TSG-WG1 Meeting #122-e, C1-200418, Feb. 20-28, 2020, 50 pgs.
(Continued)

*Primary Examiner* — Kibrom T Hailu
(74) *Attorney, Agent, or Firm* — Paratus Law Group, PLLC

(57) ABSTRACT

The present invention allows a reduction in power consumed by communications between devices over a network. A transmission-side device transmits a signal including a wake up signal, path information, and a main data signal in this order to the following relay device (switch/router). The relay device activates a circuit in a standby state on a path on the basis of the wake up signal and the path information. Relay devices on the path are sequentially activated, and the main data signal is finally received by a reception-side device.

6 Claims, 23 Drawing Sheets

(58) Field of Classification Search
CPC ........ Y02D 30/70; H04B 10/29; H04L 12/28;
H04L 12/44; H04Q 3/52
See application file for complete search history.

(56) References Cited

FOREIGN PATENT DOCUMENTS

| | | | |
|----|------------------|----|---------|
| CN | 111404617 | A  | 7/2020  |
| JP | 2006-304055 | A  | 11/2006 |
| JP | 2009-278174 | A  | 11/2009 |
| JP | 2013-162476 | A  | 8/2013  |
| JP | 2015-149640 | A  | 8/2015  |
| WO | WO 2017/057152 | A1 | 4/2017  |

OTHER PUBLICATIONS

Haojun Chinese Master's Theses, Research and Design of Energy
Efficiency Stochastic Routing in Wireless Sensor Networks, 2017,
66 pgs.

* cited by examiner

*FIG. 1*

(a)
UPLINK TRANSMISSION (b)
DOWNLINK TRANSMISSION (a) WAVELENGTH DIVISION MULTIPLEXING (WDM)

(b) POLARIZATION DIVISION MULTIPLEXING (PDM)

(c) SPACE DIVISION MULTIPLEXING (SDM)

(a) UPLINK TRANSMISSION (b) DOWNLINK TRANSMISSION

*FIG. 5*

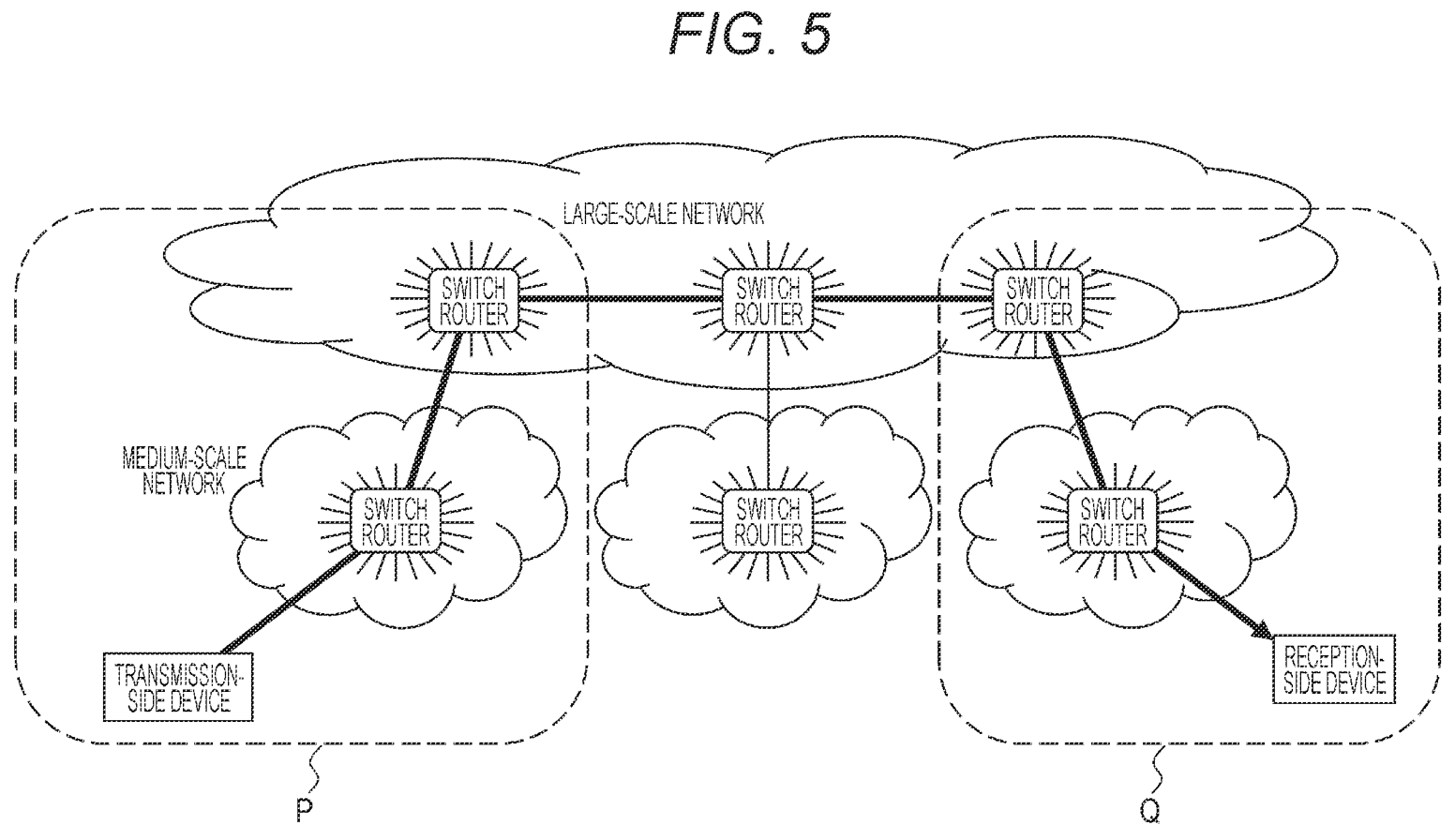

LARGE-SCALE NETWORK

SWITCH ROUTER

SWITCH ROUTER

SWITCH ROUTER

SWITCH ROUTER

SWITCH ROUTER

SWITCH ROUTER

RECEPTION-SIDE DEVICE

Q

MEDIUM-SCALE NETWORK

TRANSMISSION-SIDE DEVICE

Figure 23:
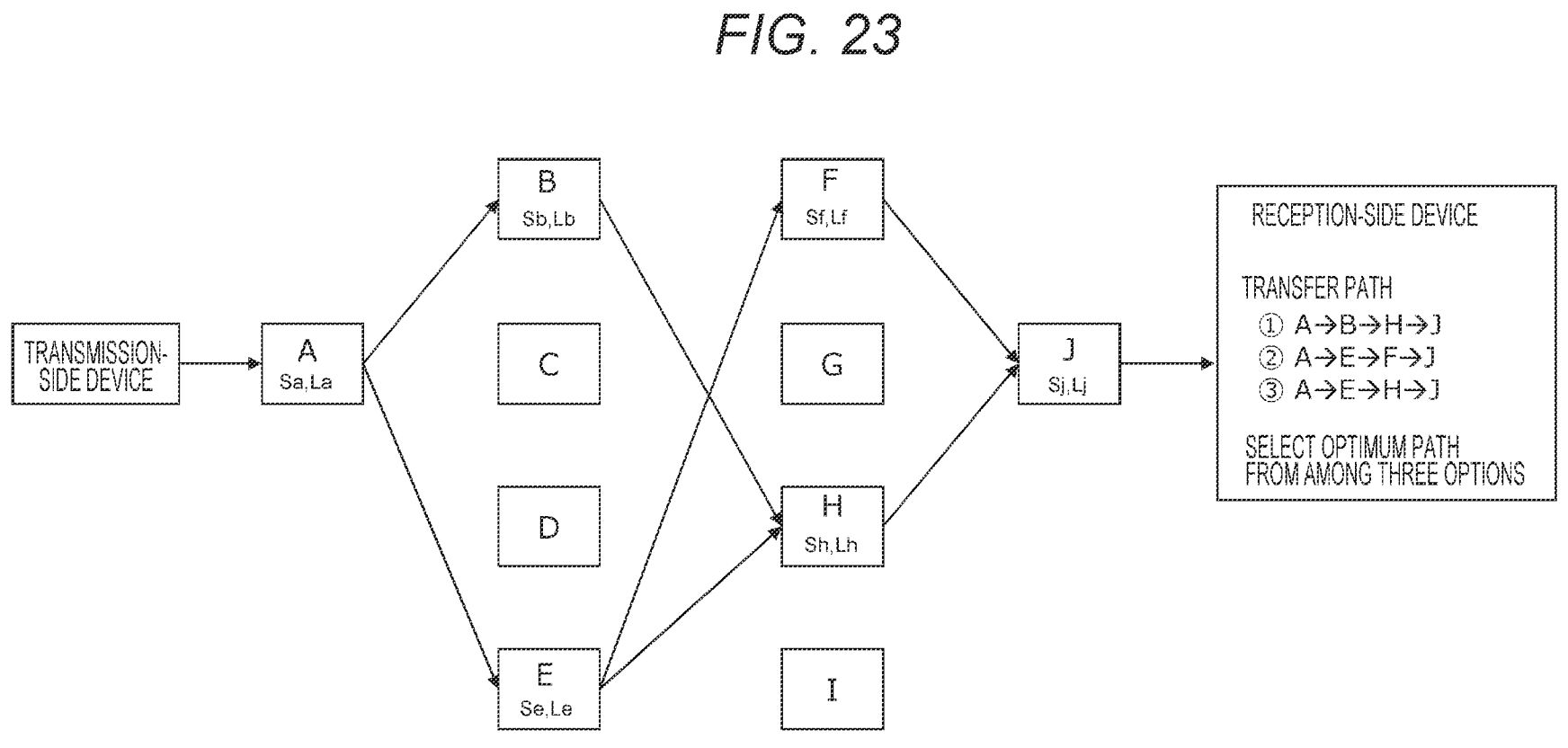

RECEPTION-SIDE DEVICE

TRANSFER PATH
① A→B→H→J
② A→E→F→J
③ A→E→H→J

SELECT OPTIMUM PATH
FROM AMONG THREE OPTIONS

J
Sj,Lj

F
Sf,Lf

G

H
Sh,Lh

I

B
Sb,Lb

C

D

E
Se,Le

A
Sa,La

TRANSMISSION-SIDE DEVICE

TRANSMISSION DEVICE, TRANSMISSION METHOD, RELAY DEVICE, RELAY DEVICE CONTROL METHOD, RECEPTION DEVICE, RECEPTION DEVICE CONTROL METHOD, AND NETWORK SYSTEM

CROSS REFERENCE TO PRIOR APPLICATION

This application is a National Stage Patent Application of PCT International Patent Application No. PCT/JP2021/029585 (filed on Aug. 11, 2021) under 35 U.S.C. § 371, which claims priority to Japanese Patent Application Nos. 2020-138184 (filed on Aug. 18, 2020) and 2021-100562 (filed on Jun. 17, 2021), which are all hereby incorporated by reference in their entirety.

TECHNICAL FIELD

The present technology relates to a transmission device, a transmission method, a relay device control method, a relay method, a reception device, a reception device control method, and a network system, and more particularly to a transmission device and the like that allow a reduction in power consumed by communications between devices over a network.

BACKGROUND ART

A data transmission network such as an optical network is known. Such a network includes a plurality of switches/routers. Such a switch/router serves as a relay device and has a routing function. In a case where data is transmitted from a certain device (transmission device) to another device (reception device), the data is transmitted through a predetermined number of switches/routers on the path.

In this case, it is sufficient if only a predetermined number of switches/routers on the path is in an active state, and the other switches/routers may be in a standby state without any problem. For example, Patent Document 1 proposes a communication device and the like capable of reducing power consumption by controlling an operation state including the standby state and the active state on the basis of a result of detection of an optical signal.

CITATION LIST

Patent Document

Patent Document 1: WO 2017/057152 A

SUMMARY OF THE INVENTION

Problems to be Solved by the Invention

It is therefore an object of the present technology to allow a reduction in power consumed by communications between devices over a network.

Solutions to Problems

Provided according to a concept of the present technology is a transmission device including:

a signal output unit that outputs a wake up signal, path information, and a main data signal in this order; and a signal transmitter that transmits a signal output from the signal output unit.

In the present technology, the signal output unit outputs the wake up signal, the path information, and the main data signal in this order. Then, the signal transmitter transmits the signal output from the signal output unit.

As described above, in the present technology, the wake up signal, the path information, and the main data signal are transmitted in this order. It is therefore possible to sequentially activate relay devices on a path and finally cause a reception device to receive the main data signal, which allows a reduction in power consumed by the relay devices and the reception device for device-to-device communications over the network.

Note that, in the present technology, for example, the signal output unit may output the wake up signal over a period just longer than an inactive period of an intermittent operation of reception determination made by a device that receives the signal transmitted from the signal transmitter, and start to output the path information at a predetermined interval after the end of the output of the wake up signal.

In this case, outputting the wake up signal over a period just longer than the inactive period of the intermittent operation of the reception determination made by the device that receives the signal transmitted from the signal transmitter allows the device that receives the signal transmitted from the signal transmitter to reliably receive the wake up signal even if the device makes the reception determination in an intermittent manner in order to reduce power consumption.

Furthermore, in this case, starting to output the path information at the predetermined interval after the end of the output of the wake up signal allows the device that receives the signal transmitted from the signal transmitter to receive the path information with a circuit necessary for processing of receiving the path information activated.

Furthermore, in the present technology, for example, the signal output unit may stop outputting the wake up signal on the basis of a reception notification transmitted from the device that receives a signal transmitted from a signal processor after the start of the output of the wake up signal, and then start to output the path information.

In this case, stopping the output of the wake up signal on the basis of the reception notification transmitted from the device that receives the signal transmitted from the signal processor after the start of the output of the wake up signal allows the device that receives the signal transmitted from the signal transmitter to reliably receive the wake up signal. Furthermore, in this case, starting to output the path information after the end of the output of the wake up signal on the basis of the reception notification allows the device that receives the signal transmitted from the signal transmitter to receive the path information with a circuit necessary for processing of receiving the path information activated.

Furthermore, in the present technology, for example, the signal output unit may start to output the main data signal at a predetermined interval after end of the output of the path information. This case allows the device that receives the signal transmitted from the signal transmitter to receive the main data signal with a necessary circuit on the path activated on the basis of the path information.

Furthermore, in the present technology, for example, the signal output unit may start to output, after the end of the output of the path information, the main data signal on the basis of a ready notification transmitted from the device that receives the signal transmitted from the signal processor. This case allows the device that receives the signal transmitted from the signal transmitter to receive the main data signal with a necessary circuit on the path activated on the basis of the path information.

signal with a necessary circuit on the path reliably activated on the basis of the path information.

Furthermore, provided according to another concept of the present technology is a relay device including:

a signal receiver including a receiver that receives a wake up signal and path information in this order and a reception processor that processes a signal output from the receiver;

a plurality of signal transmitters;

a routing unit that selectively transmits a signal output from the reception processor of the signal receiver to a target signal transmitter, the target signal transmitter being any one of the plurality of signal transmitters;

a signal reception determination unit that determines whether the wake up signal has been received on the basis of the signal output from the receiver of the signal receiver;

a path selector that selects a path on the basis of the path information included in the signal output from the reception processor of the signal receiver; and a controller that performs control to activate the reception processor of the signal receiver and the path selector on the basis of a result of determination that the wake up signal has been received made by the signal reception determination unit, bring, on the basis of the path selected by the path selector, a circuit of the routing unit and the target signal transmitter corresponding to the path from a standby state into an active state, and cause the target signal transmitter brought into the active state to output the wake up signal and the path information in this order.

In the present technology, the signal receiver receives and processes the wake up signal and the path information in this order. The routing unit selectively transmits the signal output from the reception processor of the signal receiver to the target signal transmitter that is any one of the plurality of signal transmitter. The signal reception determination unit determines whether the wake up signal has been received on the basis of the signal output from the receiver of the signal receiver. The path selector selects a path on the basis of the path information included in the signal output from the reception processor of the signal receiver.

Then, the controller performs control to activate the reception processor of the signal receiver and the path selector on the basis of the result of determination that the wake up signal has been received made by the signal reception determination unit. The controller further performs control to activate the circuit of the routing unit and the target signal transmitter corresponding to the path selected by the path selector on the basis of the path. The controller further performs control to cause the target signal transmitter thus activated to transmit the wake up signal and the path information in this order.

As described above, in the present technology, the wake up signal and the path information are received in this order, the reception processor of the signal receiver and the path selector are activated on the basis of the result of determination that the wake up signal has been received, the circuit of the routing unit and the target signal transmitter corresponding to the path selected by the path selector are activated on the basis of the path, and the target signal transmitter thus activated outputs the wake up signal and the path information in this order. It is therefore possible to sequentially activate the relay devices on the path, which allows a reduction in power consumed by the relay devices for device-to-device communications over the network.

Note that, in the present technology, for example, the path selector may select one path indicated by the path information. It is therefore possible to select one path, for example, the shortest path connecting the transmission device and the reception device.

Furthermore, in the present technology, for example, the path selector may select a plurality of shorter paths from among a plurality of paths up to the reception device determined on the basis of information regarding the reception device included in the path information. It is therefore possible to set a plurality of shorter paths as the path connecting the transmission device and the reception device and select and use an optimum path for the reception device from among the paths.

Furthermore, in the present technology, for example, the path selector may select, using a possible transfer rate and/or a latency of the following relay device as determination information, a plurality of paths from among a plurality of paths up to the reception device determined on the basis of information regarding the reception device included in the path information. It is therefore possible to set a plurality of paths with importance placed on the possible transfer rate or the latency as the path connecting the transmission device and the reception device and select and use an optimum path for the reception device from among the paths.

In this case, for example, the path selector may selectively use the possible transfer rate or the latency as the determination information in a manner that depends on what kind of application the main data signal transmitted from the transmission device to the reception device relates to. It is therefore possible to set, when a plurality of paths is set, a path with importance placed on the possible transfer rate or the latency in a manner that depends on the application.

Furthermore, in the present technology, for example, when transmitting the wake up signal and the path information in this order, the target signal transmitter brought into the active state on the basis of the path selected by the path selector may add, to the path information, information regarding a relay device to which the target signal transmitter belongs and information regarding the possible transfer rate and the latency of the relay device. This allows the reception device to select one path from among a plurality of paths set by sequentially transmitting the wake up signal and the path information using the information regarding the possible transfer rates or the latencies of relay devices constituting the paths.

Furthermore, in the present technology, for example, the target signal transmitter may output the wake up signal over a period just longer than an inactive period of an intermittent operation of reception determination made by a device that receives a signal transmitted from the target signal transmitter, and start to output the path information at a predetermined interval after the end of the output of the wake up signal.

In this case, outputting the wake up signal over a period just longer than the inactive period of the intermittent operation of the reception determination made by the device that receives the signal transmitted from the target signal transmitter allows the device that receives the signal transmitted from the signal transmitter to reliably receive the wake up signal even if the device makes the reception determination in an intermittent manner in order to reduce power consumption.

Furthermore, in this case, starting to output the path information at the predetermined interval after the end of the output of the wake up signal allows the device that receives the signal transmitted from the target signal transmitter to receive the path information with a circuit necessary for processing of receiving the path information activated.

Furthermore, in the present technology, for example, the target signal transmitter may stop outputting the wake up signal on the basis of a reception notification transmitted from a device that receives a signal transmitted from the target signal transmitter after the start of the output of the wake up signal, and then start to output the path information.

In this case, stopping the output of the wake up signal on the basis of the reception notification transmitted from the device that receives the signal transmitted from the target signal processor after the start of the output of the wake up signal allows the device that receives the signal transmitted from the target signal transmitter to reliably receive the wake up signal. Furthermore, in this case, starting to output the path information after the end of the output of the wake up signal on the basis of the reception notification allows the device that receives the signal transmitted from the target signal transmitter to receive the path information with a circuit necessary for processing of receiving the path information activated.

Furthermore, in the present technology, for example, the target signal transmitter may start to output a main data signal included in the signal output from the reception processor of the signal receiver at a predetermined interval after the end of the output of the path information. This case allows the device that receives the signal transmitted from the target signal transmitter to receive the main data signal with a necessary circuit on the path activated on the basis of the path information.

Furthermore, in the present technology, for example, the target signal transmitter may start to output, after the end of the output of the path information, a main data signal included in the signal output from the reception processor of the signal receiver on the basis of a ready notification transmitted from a device that receives a signal transmitted from the target signal transmitter. This case allows the device that receives the signal transmitted from the target signal transmitter to receive the main data signal with a necessary circuit on the path reliably activated on the basis of the path information.

Furthermore, in the present technology, for example, a storage that temporarily stores a main data signal included in the signal output from the reception processor of the signal receiver may be further provided. In a case where the main data signal is received from a device that transmits a signal to the receiver of the signal receiver before the circuit of the routing unit and the target signal transmitter corresponding to the path selected by the path selector are activated on the basis of the path, it is possible to temporarily store the main data signal into the storage, and cause the target signal transmitter to transmit the wake up signal, the path information, and the main data signal in this order after the circuit of the routing unit and the target signal transmitter corresponding to the path selected by the path selector are activated.

Furthermore, in the present technology, for example, a notification transmitter may be further provided, the notification transmitter transmitting a reception notification to a device that transmits a signal to the receiver of the signal receiver after the reception processor of the signal receiver and the path selector are activated to start up a circuit on the basis of the result of determination that the wake up signal has been received made by the signal reception determination unit. In this case, the device that transmits a signal to the receiver of the signal receiver can know the timing appropriate for the start of the output of the path information.

Furthermore, in the present technology, for example, a notification transmitter may be further provided, the notification transmitter transmitting a ready notification to a device that transmits a signal to the receiver of the signal receiver after the circuit of the routing unit and the target signal transmitter corresponding to the path selected by the path selector are activated to start up a circuit on the basis of the path. In this case, the device that transmits a signal to the receiver of the signal receiver can know the timing appropriate for the start of the output of the main data signal.

Furthermore, in the present technology, for example, the controller may bring a circuit portion corresponding to a predetermined number of paths selected by the path selector from the standby state into the active state, and then maintain a circuit portion corresponding to a path recognized to be in use in the active state and bring a circuit portion corresponding to a path recognized to be in non-use back from the active state into the standby state. This allows the relay device to reduce wasteful power consumption.

In this case, for example, the controller may recognize that a path through which a return signal is transmitted from a reception device is in use, and recognize that a path through which no return signal is transmitted from the reception device during a certain period is in non-use. Such a configuration provides an advantage in that the reception device need not transmit the return signal for a path selected not to be used.

Furthermore, in this case, for example, the controller may recognize that a path through which a return signal including information indicating in-use is transmitted from a reception device is in use, and recognize that a path through which a return signal including information indicating non-use is transmitted from the reception device is in non-use. This makes it possible to recognize a path in use and a path in non-use more correctly and perform processing.

Furthermore, in this case, for example, the controller may recognize that a path through which a return signal is transmitted from a reception device and that coincides with a path indicated by in-use path information included in the return signal is in use, and recognize that a path through which the return signal is transmitted from the reception device and that does not coincide with the path indicated by the in-use path information included in the return signal is in non-use. Such a configuration allows the reception device to transmit the same return signal without distinguishing between a path in use and a path in non-use.

Furthermore, provided according to another concept of the present technology is a reception device including:

a signal receiver including a receiver that receives a wake up signal and a main data signal in this order, and a reception processor that processes a signal output from the receiver;

a signal processor that processes the main data signal included in the signal output from the signal receiver;

a signal reception determination unit that determines whether the wake up signal has been received on the basis of the signal output from the receiver of the signal receiver; and a controller that performs control to activate the reception processor of the signal receiver and the signal processor on the basis of a result of determination that the wake up signal has been received made by the signal reception determination unit.

In the present technology, the signal receiver receives and processes the wake up signal and the main data signal in this order. The signal processor processes the main data signal included in the signal output from the signal receiver. The signal reception determination unit determines whether the wake up signal has been received on the basis of the signal output from the receiver of the signal receiver. Then, the controller performs control to activate the reception processor of the signal receiver and the signal processor on the basis of the result of determination that the wake up signal has been received made by the signal reception determination unit.

As described above, in the present technology, the wake up signal and the main data signal are received in this order, and the reception processor of the signal receiver and the signal processor are activated on the basis of the result of determination that the wake up signal has been received. It is therefore possible to reduce power consumed by the reception device for device-to-device communications over the network.

Note that, in the present technology, for example, a notification transmitter may be further provided, the notification transmitter transmitting a ready notification to a device that transmits a signal to the signal receiver after the reception processor of the signal receiver and the signal processor are activated to start up a circuit on the basis of the result of determination that the wake up signal has been received made by the signal reception determination unit. In this case, the device that transmits a signal to the receiver of the signal receiver can know the timing appropriate for the start of the output of the main data signal.

Furthermore, in the present technology, for example, a path selector may be further provided, the path selector selecting, when the receiver of the signal receiver receives the wake up signal through a plurality of paths for establishing a connection to a transmission device, any one of the plurality of paths, and the controller may further control transmission processing of transmitting, through some or all of the plurality of paths, a return signal for maintaining each circuit portion constituting the selected path in an active state and bringing each circuit portion constituting an unselected path back from the active state into a standby state. It is therefore possible to select an optimum path from a plurality of paths and perform communications, and to reduce wasteful power consumption on the network by bringing each circuit portion constituting an unselected path back from the active state into the standby state.

In this case, for example, the controller may select any one of the plurality of paths on the basis of information regarding possible transfer rates and/or latencies of a predetermined number of relay units constituting a path included in path information received by the receiver of the signal receiver after the wake up signal. It is therefore possible to easily select one path from among a plurality of paths with importance placed on the possible transfer rate or the latency.

Furthermore, in this case, for example, in the transmission processing, the return signal may be transmitted through the selected path. Such a configuration provides an advantage in that the return signal need not be transmitted for a path selected not to be used.

Furthermore, in this case, for example, in the transmission processing, a return signal including information indicating in-use may be transmitted through the selected path, and a return signal including information indicating non-use may be transmitted through the unselected path. Such a configuration allows each relay device constituting a plurality of paths to correctly recognize a path in use and a path in non-use and perform processing.

Furthermore, in this case, for example, in the transmission processing, a return signal including in-use path information may be transmitted through the plurality of paths. Such a configuration makes it possible to transmit the same return signal without distinguishing between a path in use and a path in non-use.

Furthermore, provided according to another concept of the present technology is a network system including a transmission device, a reception device, and a predetermined number of relay devices interposed between the transmission device and the reception device, and a wake up signal, path information, and a main data signal are transmitted in this order from the transmission device, and necessary circuits on a path from the transmission device to the reception device are sequentially activated to cause the reception device to receive the main data signal.

In the present technology, the network system includes the transmission device, the reception device, and the predetermined number of relay devices interposed between the transmission device and the reception device. Then, the wake up signal, the path information, and the main data signal are transmitted in this order from the transmission device, and necessary circuits on a path up to the reception device are sequentially activated to cause the reception device to receive the main data signal. For example, the relay device may be a switch/router.

As described above, in the present technology, the wake up signal, the path information, and the main data signal are transmitted in this order from the transmission device, and necessary circuits on a path from the transmission device to the reception device are sequentially activated to cause the reception device to receive the main data signal. It is therefore possible to reduce power consumed by device-to-device communications over the network.

BRIEF DESCRIPTION OF DRAWINGS

FIG. 1 is a diagram illustrating an example of an optical network system.

FIG. 3 is a diagram illustrating an example of an optical network system.

FIG. 4 is a diagram for describing how an optical network system operates in a case where a wavelength division multiplexing system is applied.

FIG. 5 is a diagram illustrating an example of a network system in which a transmission-side device and a reception-side device are connected over a network.

FIG. 11 is a diagram illustrating a configuration example of a reception-side device and a switch/router as a relay device connected to the reception-side device in a case where the new network system as the first embodiment is applied.

FIG. 12 is a diagram illustrating a more specific configuration example of the reception-side device and the switch/router.

FIG. 13 is a diagram illustrating a configuration example of a transmission-side device and a switch/router as a second embodiment.

FIG. 14 is a diagram illustrating a configuration example of a transmission-side device and a switch/router as a relay device connected to the transmission-side device in a case where a new network system as a third embodiment is applied.

FIG. 23 is a diagram illustrating an example of processing of selecting one path from among a plurality of paths.

MODE FOR CARRYING OUT THE INVENTION

Hereinafter, modes for carrying out the present invention (hereinafter, referred to as embodiments) will be described. Note that the description will be given in the following order.

1. First Embodiment
2. Second Embodiment
3. Third Embodiment
4. Fourth Embodiment
5. Modification

1. First Embodiment

Description of Related Art

Figure 1:
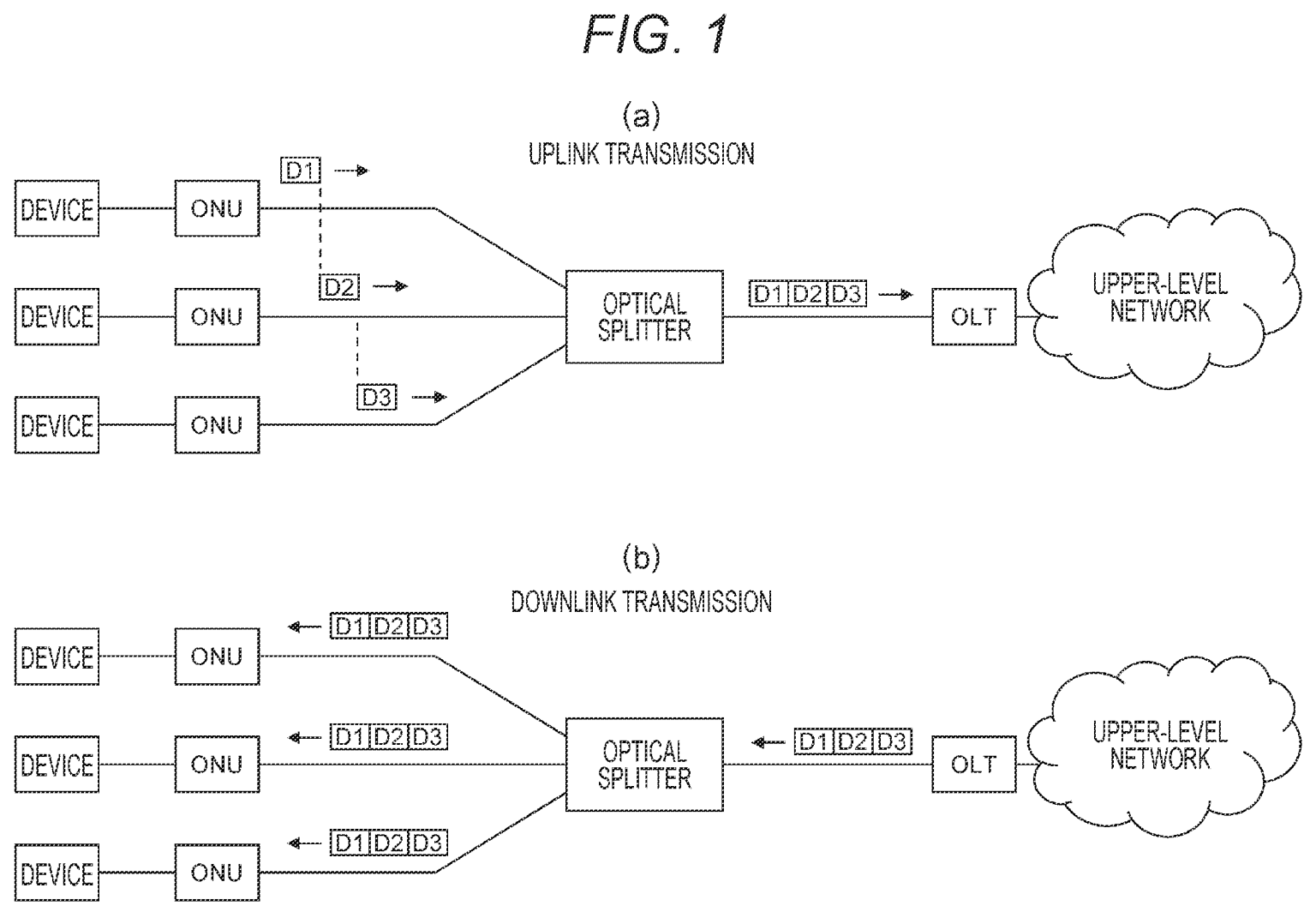

First, a technology related to the present technology will be described. Consider a current network access network such as a passive optical network (PON), for example. As illustrated in FIG. 1, the use of an optical splitter allows communications between an optical line terminal (OLT) located on a base station side and a plurality of optical network units (ONUs) located on a user side. The OLT is connected to the optical splitter over one fiber, and the optical splitter splits light to allow the OLT to connect to each user.

In a case of uplink transmission as illustrated in FIG. 1(*a*), pieces of data output from each ONU located on the user side, D1, D2, D3 in the illustrated example, are multiplexed by the optical splitter. In order to avoid duplication, a data transmission timing and data transmission amount are controlled among the ONUs to allow multiplexing in a time axis direction. In a case of downlink transmission as illustrated in FIG. 1(*b*), data output from the OLT, that is, data in which D1, D2, D3 are multiplexed in the time axis direction in the illustrated example, is commonly transmitted to each ONU located on the user side through the optical splitter. At this time, each ONU located on the user side extracts only data addressed to the ONU itself. Note that the uplink transmission and the downlink transmission are different in optical signal wavelength from each other and thus can be performed without interference even if data overlaps on the time axis.

As described above, in the current network access network, the connections between each user-side device and the network are superposed in the time axis direction (time division multiplexed) in order to avoid conflict with a large number of devices, and restrictions are put on the amount of data that can be communicated.

Figure 2:
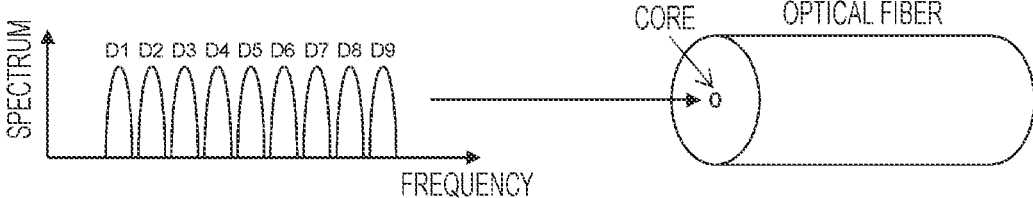
FIG. 2 is a diagram for describing an example of a system that can reduce restrictions on the amount of data that can be communicated.
Figure 2:
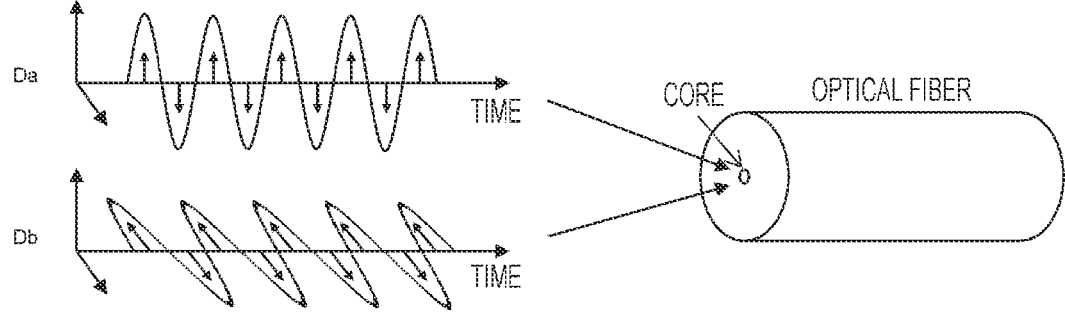
Figure 2:
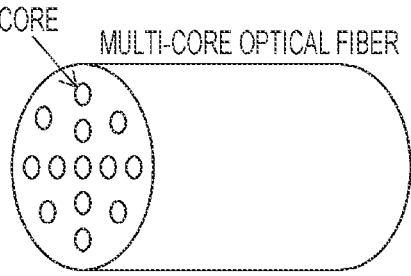

Studies have been conducted to reduce the above-described restrictions on the amount of data that can be communicated. FIG. 2 illustrates an example of a system that can reduce the restrictions on the amount of data that can be communicated. FIG. 2(*a*) illustrates a wavelength division multiplexing (WDM) system in which, using a characteristic that light does not interfere when wavelengths are different, each piece of data is superposed on each of the plurality of wavelengths to allow the plurality of pieces of data to be communicated over one optical fiber, thereby increasing the amount of data that can be communicated.

FIG. 2(*b*) illustrates polarization division multiplexing (PDM) system in which, using a characteristic that light has a component that travels while vertically oscillating and a component that travels while horizontally oscillating, and the two components do not interfere with each other, each piece of data is superposed on each of the two components to allow the two pieces of data to be communicated over one optical fiber, thereby increasing the amount of data that can be communicated.

FIG. 2(*c*) illustrates space division multiplexing (SDM) system in which a plurality of cores is provided in one optical fiber to allow a plurality of pieces of data to be communicated without physical interference, thereby increasing the amount of data that can be communicated. Note that a combination of the above-described systems allows a further increase in the amount of data that can be communicated.

Figure 3:
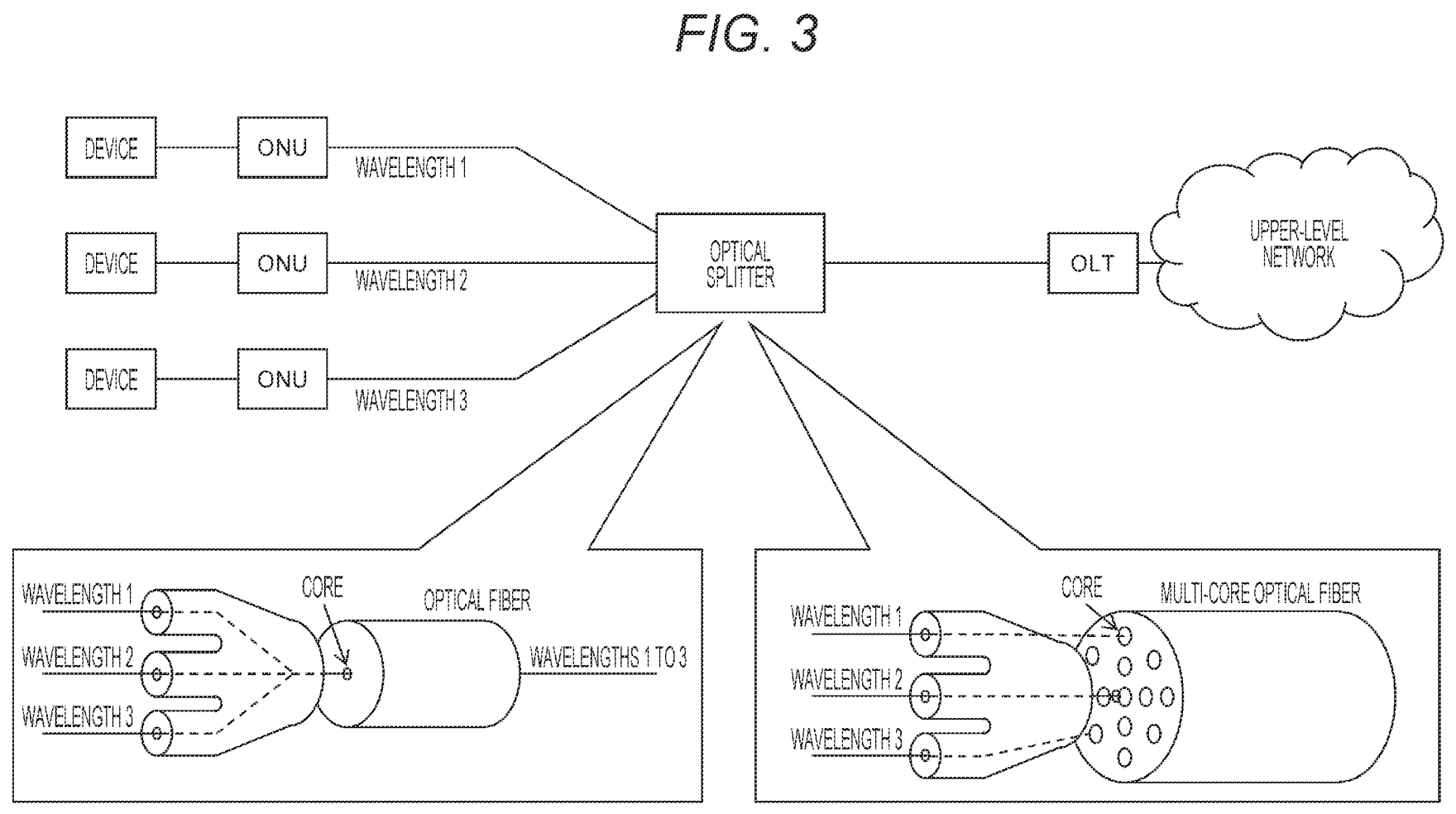

As described above, a plurality of pieces of data can be superposed on each other over one optical fiber without interfering with each other. For example, in a case where the wavelength division multiplexing system is applied, as illustrated in FIG. 3, light having a plurality of wavelengths coming from the ONUs can be bundled into one by the optical splitter and transmitted toward the OLT. That is, this eliminates the need of time-division multiplexing, so that it is possible to perform communications between the ONUs and the OLT using each wavelength as a dedicated line. Note that in a case where the wavelength division multiplexing system and the space division multiplexing system are combined using a multi-core optical fiber, an increase in the number of cores allows a further increase in bandwidth.

Figure 4:
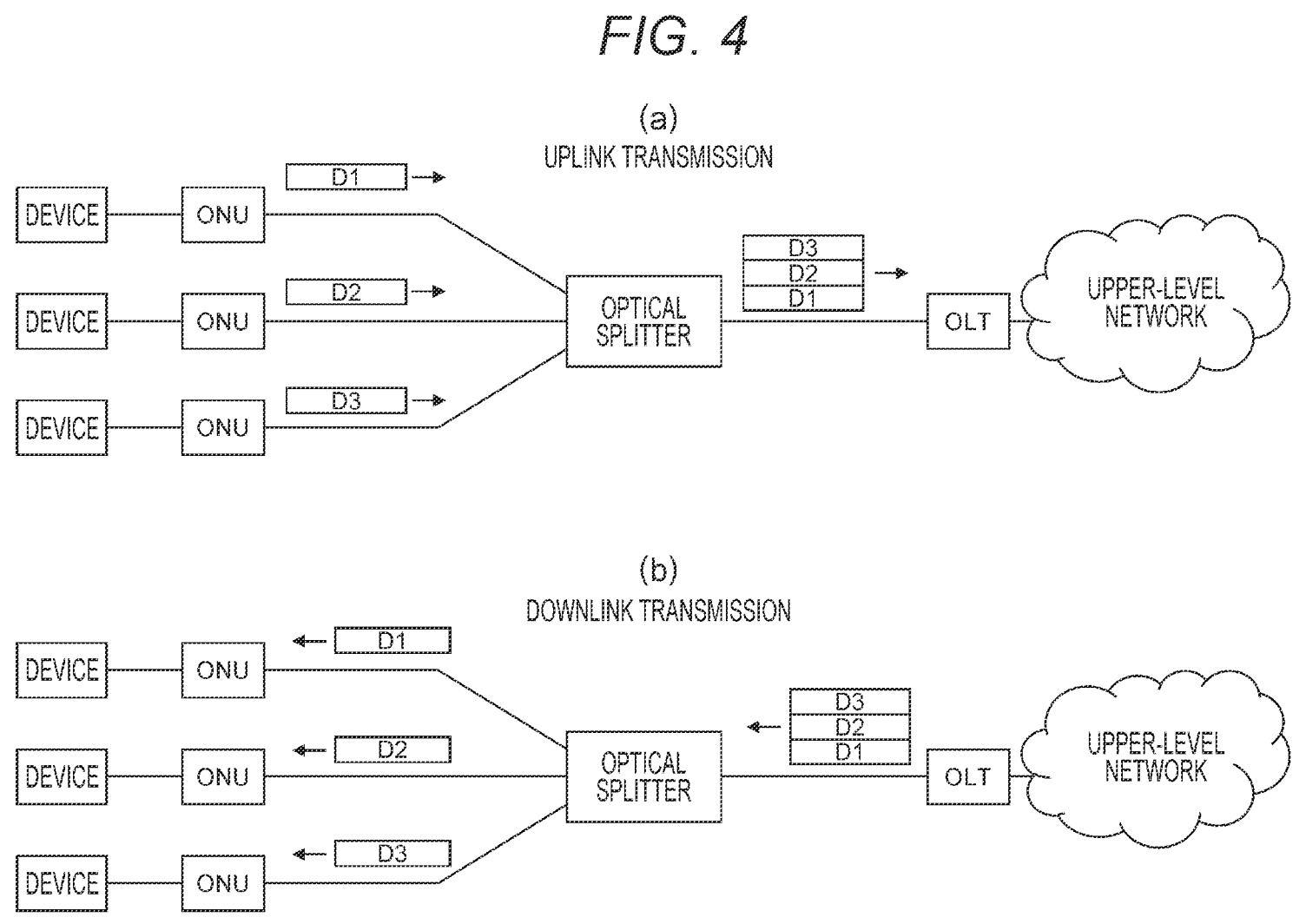

FIG. 4 illustrates an example of how communications between the OLT located on the base station side and the plurality of ONUs located on the user side are performed in a case where the wavelength division multiplexing system is applied, for example. In a case of uplink transmission as illustrated in FIG. 4(a), pieces of data output from each ONU located on the user side, D1, D2, D3 in the illustrated example, have different wavelengths, and thus can be transmitted to the OLT over one fiber without interfering with each other even with the pieces of data bundled by the optical splitter. This allows each user-side device to transmit data without worrying about conflict with other devices and without restrictions on time. The same applies to downlink transmission as illustrated in FIG. 4(b).

Note that FIG. 4 illustrates an example of a case where the wavelength division multiplexing system is applied, but the same applies to a case where the polarization division multiplexing system or the space division multiplexing system is applied, and further applies to a case where a combination of such systems is applied.

In a case where a system (hereinafter, referred to as "new network system") using the wavelength division multiplexing system, the polarization division multiplexing system, the space division multiplexing system, or a combination of such systems described above is implemented, a topology close to a peer-to-peer (P2P) connection like a network system illustrated in FIG. 5 can also be implemented as connections between devices over a network.

When each switch/router selects a path, each signal is usually bundled more and more, that is, time-division-multiplexed and transferred, as going to an upper layer, but if the new network system is applied, the number of paths that can be used as a dedicated line dramatically increases, so that the necessity of time-division-multiplexing is reduced, and in an extreme case, devices can be connected to each other using a dedicated line like P2P connection even over a network.

Figure 6:
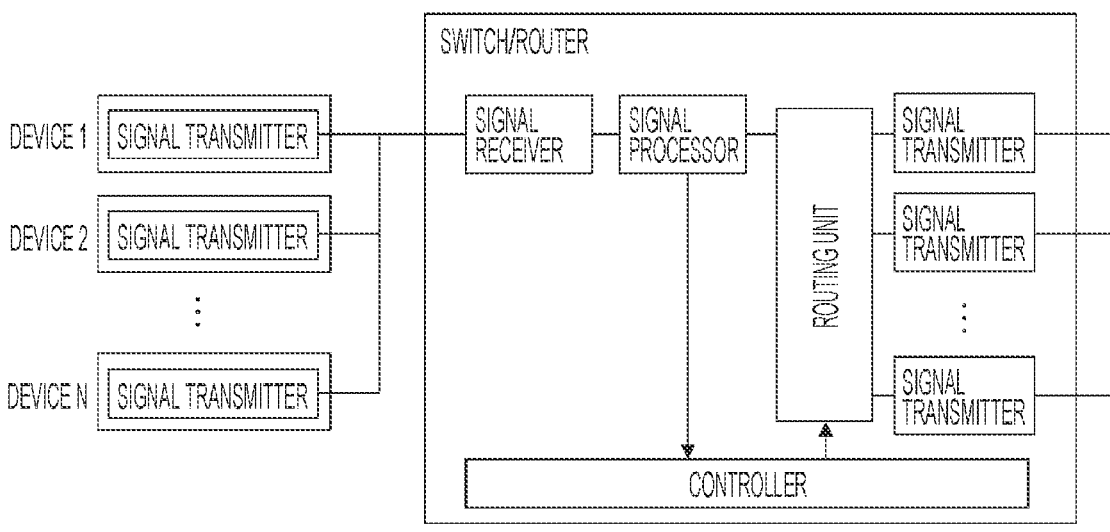
FIG. 6 is a diagram illustrating a configuration example of each transmission-side device and a switch/router connected to the device in a case where time division multiplexing system is applied as in the related art.

FIG. 6 illustrates a configuration example of a transmission-side device 1, a transmission-side device 2, . . . , and a transmission-side device N and a switch/router to which each device is connected in a case where the time division multiplexing system is applied as in the related art. In this case, the switch/router only needs to include one receiver, a processor located downstream of the receiver determines the destination of each data, and a controller performs routing and transmits the data.

Figure 7:
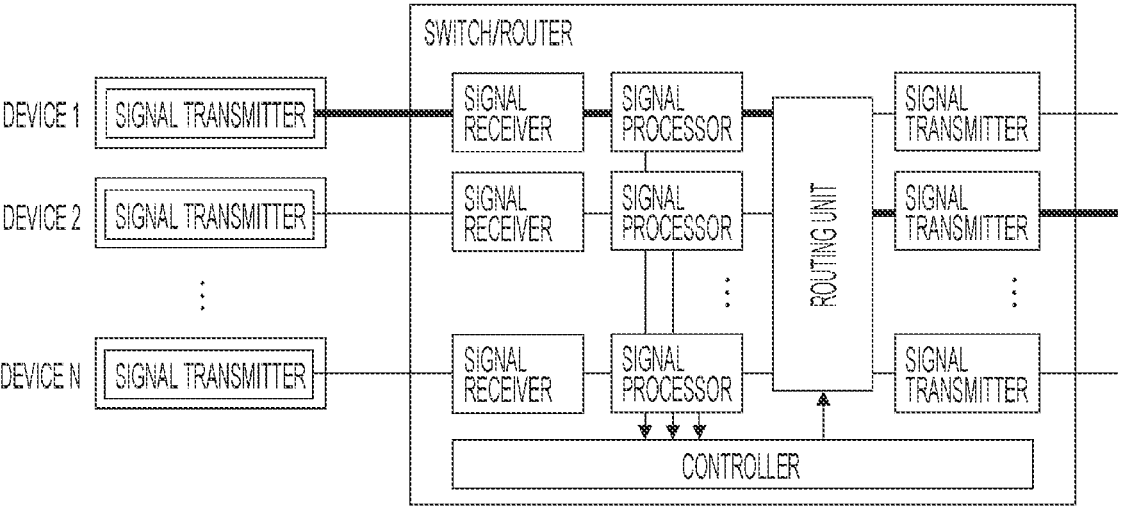
FIG. 7 is a diagram illustrating a configuration example of each device and a switch/router connected to the device in a case where a new network system is applied.

FIG. 7 illustrates a configuration example of a transmission-side device 1, a transmission-side device 2, and a transmission-side device N and a switch/router . . . , to which each device is connected in a case where the new network system is applied. In this case, a line connected to each device needs to adapt to one-to-one transmission/reception, and the switch/router includes a receiver and a processor for each device, which increases a circuit scale. This will cause an increase in power consumption, and such a problem needs to be solved.

"Configuration Example of Transmission-Side Device and Switch/Router Connected to Transmission-Side Device"

Figure 8:
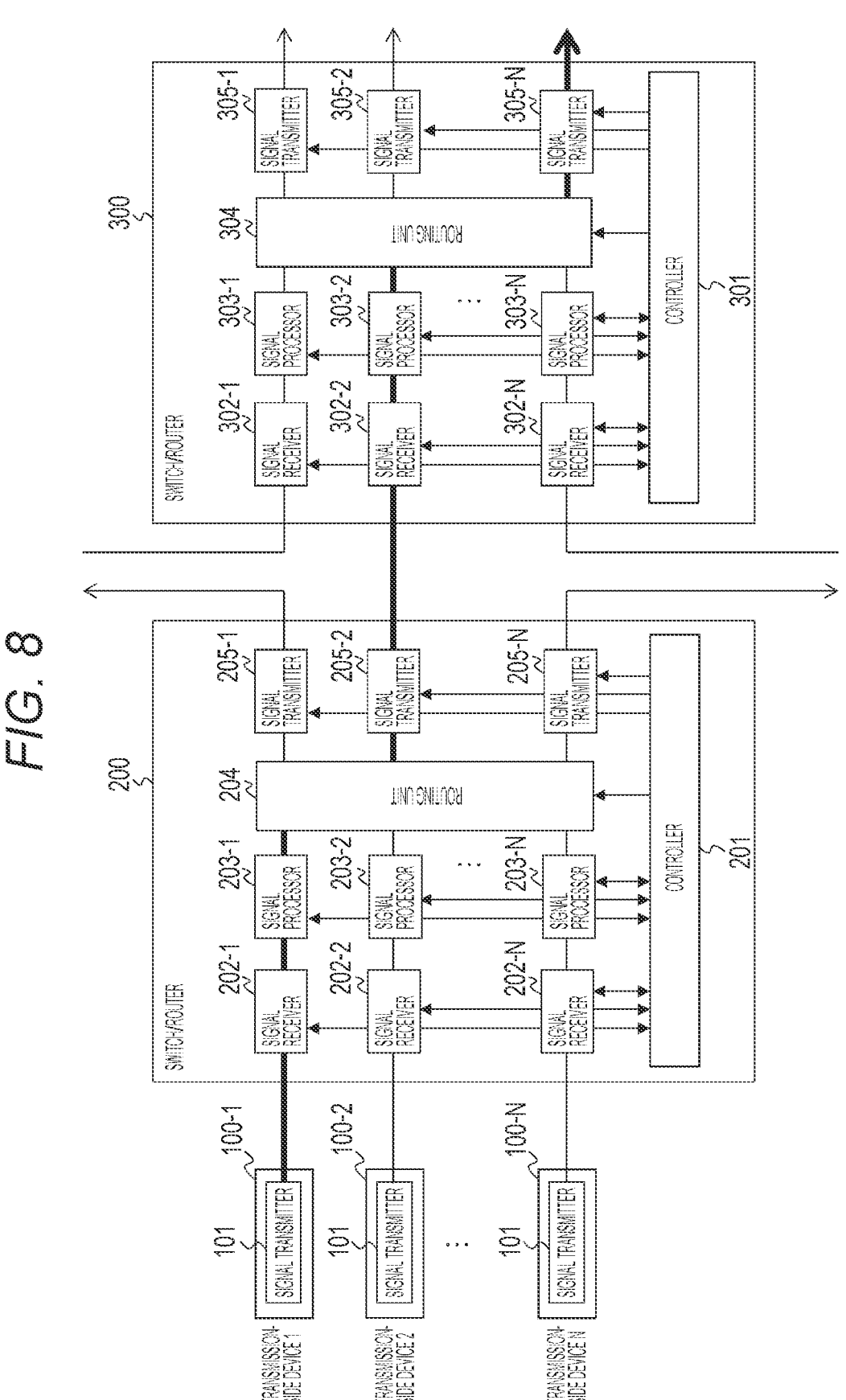
FIG. 8 is a diagram illustrating a configuration example of a transmission-side device and a switch/router as a relay device connected to the transmission-side device in a case where a new network system as a first embodiment is applied.

FIG. 8 illustrates a configuration example of a transmission-side device (transmission device) and a switch/router as a relay device connected to the transmission-side device in a case where a new network system as a first embodiment is applied. This configuration example corresponds to the transmission-side device, the switch/router constituting a medium-scale network, and the switch/router constituting a large-scale network enclosed by a dashed-line frame P in the network system illustrated in FIG. 5.

In the configuration example illustrated in FIG. 8, N devices 100-1, 100-2, . . . , and 100-N are transmission-side devices belonging to different users. Each device includes a signal transmitter 101 that transmits an optical signal. Here, the optical signal output from the signal transmitter 101 includes a wake up signal, path information, and a main data signal in this order.

Furthermore, in the configuration example illustrated in FIG. 8, a switch/router 200 is a switch/router constituting a medium-scale network. The switch/router 200 includes a controller 201, N signal receivers 202-1, 202-2, . . . , and 202-N, N signal processors 203-1, 203-2, . . . , and 203-N, a routing unit 204, and N signal transmitters 205-1, 205-2, . . . , and 205-N.

The controller 201 controls how each component of the switch/router 200 operates. The signal receivers 202-1, 202-2, . . . , and 202-N each receive the optical signal transmitted from a corresponding one of the devices 100-1, 100-2, . . . , and 100-N. The signal processors 203-1, 203-2, . . . , and 203-N each select one path on the basis of the path information included in the signal received by a corresponding one of the signal receivers 202-1, 202-2, . . . , and 202-N. The signal processor 203-1, 203-2, . . . , and 203-N each serve as a path selector. Here, the path information is, for example, information regarding one path, for example, the shortest path connecting a transmission device (transmission-side device) and a reception device (reception-side device).

The routing unit 204 transmits, on the basis of the path selected by each of the signal processors 203-1, 203-2, . . . , and 203-N, the main data signal included in the signal received by a corresponding one of the signal receivers 202-1, 202-2, . . . , and 202-N to a signal transmitter corresponding to the path under the control of the controller 201. The signal transmitters 205-1, 205-2, . . . , and 205-N each transmit the optical signal including the main data signal transmitted from the routing unit 204. Here, the optical signal output from each of the signal transmitters 205-1, 205-2, . . . , and 205-N includes the wake up signal, the path information, and the main data signal in this order.

The switch/router 200 activates, on the basis of a determination that the wake up signal has been received by each of the signal receivers 202-1, 202-2, . . . , and 202-N, a corresponding reception processor and a corresponding signal processor that performs path selection under the control of the controller 201. Furthermore, the switch/router 200 activates, on the basis of the path selected by each of the signal processor 203-1, 203-2, . . . , and 203-N, a circuit of the routing unit 204 and a signal transmitter (target signal transmitter) corresponding to the path under the control of the controller 201. Controlling the activation of each component in this manner allows a reduction in power consumption.

Furthermore, in the configuration example illustrated in FIG. 8, a switch/router 300 is a switch/router constituting a large-scale network. The switch/router 300 includes a controller 301, N signal receivers 302-1, 302-2, . . . , and 302-N, N signal processors 303-1, 303-2, . . . , and 303-N, a routing unit 304, and N signal transmitters 305-1, 305-2, . . . , and 305-N.

The switch/router 300 is similar in configuration to the above-described switch/router 200, so that no detailed description will be given of the switch/router 300. Note that the signal receivers 302-1, 302-2, . . . , and 302-N each receive an optical signal transmitted from another switch/router constituting a medium-scale network or a large-scale network.

In the example configuration illustrated in FIG. 8, for example, a signal transmitted from the device 100-1 is received by the signal receiver 202-1 of the switch/router 200 and transmitted from the signal transmitter 205-2 of the switch/router 200 to the switch/router 300. The signal transmitted from the signal transmitter 205-2 of the switch/router 200 is then received by the signal receiver 302-2 of the switch/router 300 and transmitted from the signal transmitter 305-N of the switch/router 300 to the following device.

Figure 9:
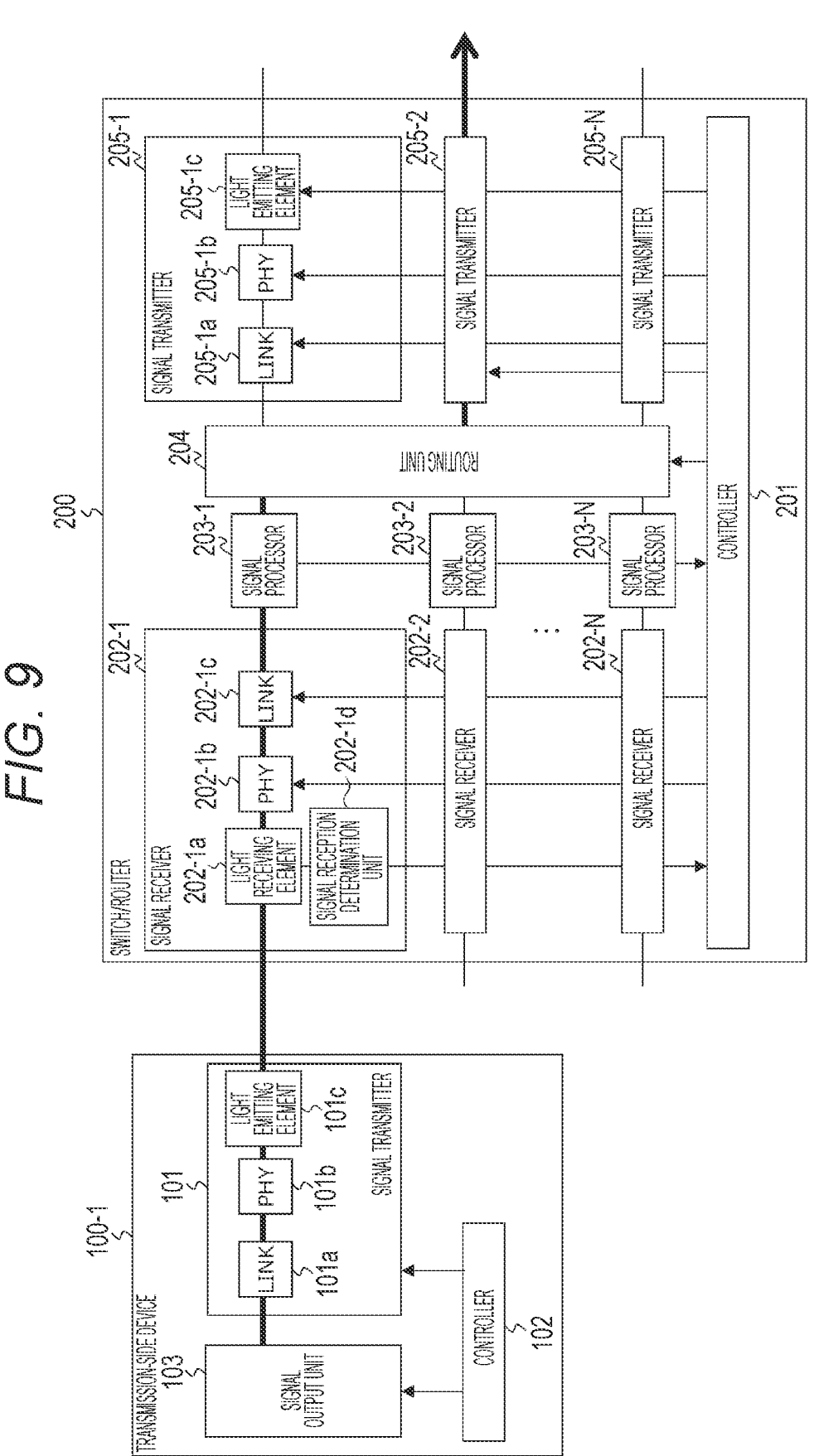
FIG. 9 is a diagram illustrating a more specific configuration example of the transmission-side device and the switch/router.

FIG. 9 illustrates a more specific configuration example of the device 100-1 and the switch/router 200 illustrated in FIG. 8. Note that the devices 100-2 to 100-N are not illustrated but are similar in configuration to the device 100-1. In FIG. 9, components corresponding to the components illustrated in FIG. 8 will be denoted by the same reference numerals, and no detailed description will be given of such components as appropriate.

The device 100-1 includes a controller 102 and a signal output unit 103 in addition to the above-described signal transmitter 101. The controller 102 controls how each component of the device 100-1 operates. The signal output unit 103 outputs a signal to be transmitted to the switch/router 200. This signal includes the wake up signal, the path information, and the main data signal in this order.

The signal transmitter 101 transmits the optical signal as described above. The signal transmitter 101 includes a LINK unit 101a, a PHY unit 101b, and a light emitting element 101c. The LINK unit 101a and the PHY unit 101b perform transmission processing on the signal output from the signal output unit 103. The LINK unit 101a and the PHY unit 101b constitute a transmission processor.

Here, PHY and LINK correspond to Layer 1 and Layer 2 of the communication network hierarchical model, respectively. Layer 1 is responsible for physical transmission and reception of digital signals, and Layer 2 is responsible for transfer of information data such as identification of a communication entity. Note that the present technology is not limited by such PHY/LINK.

The light emitting element 101c converts the signal output from the PHY unit 101b from an electrical signal into an optical signal and transmits the optical signal to the switch/router 200. The light emitting element 101c serves as a transmitter.

The signal receiver 202-1 of the switch/router 200 receives the optical signal transmitted from the device 100-1 as described above. The signal receiver 202-1 includes a light receiving element 202-1a, a PHY unit 202-1b, a LINK unit 202-1c, and a signal reception determination unit 202-1d. The light receiving element 202-1a receives the optical signal transmitted from the device 100-1 and converts the optical signal into an electrical signal. The light receiving element 202-1a serves as a receiver.

The PHY unit 202-1b and the LINK unit 202-1c perform reception processing on the signal output from the light receiving element 202-1a and transmit the signal to the signal processor 203-1. The PHY unit 202-1b and the LINK unit 202-1c constitute a reception processor. The signal reception determination unit 202-1d determines whether the wake up signal has been received on the basis of the signal output from the light receiving element 202-1a, and transmits a result of the determination to the controller 201. The controller 201 activates, on the basis of the result of determination that the wake up signal has been received, the reception processor (the PHY unit, the LINK unit) of the signal receiver 202-1 and the signal processor 203-1 that are in a standby state to bring the reception processor and the signal processor 203-1 into an active state.

The signal processor 203-1 thus activated selects a path on the basis of the path information next to the wake up signal in the signal output from the signal receiver 202-1, and transmits a result of the selection to the controller 201. The controller 201 activates, on the basis of the path selected by the signal processor 203-1, a circuit of the routing unit 204 and a signal transmitter (target signal transmitter) that are in the standby state and correspond to the path to bring the circuit and the signal transmitter into the active state.

Accordingly, the main data signal next to the path information in the signal output from the signal receiver 202-1 is transmitted to the signal transmitter (target signal transmitter) corresponding to the path, and is transmitted from the target signal transmitter to the following device as an optical signal. Note that, in this case, the signal transmitted from the target signal transmitter to the following device includes the wake up signal and the path information in this order before the main data signal in order to activate a necessary circuit of the following device.

Although no detailed description will be given, the signal receivers 202-2 to 202-N of the switch/router 200 are similar in configuration to the signal receiver 202-1.

Furthermore, the signal transmitter 205-1 of the switch/router 200 includes a LINK unit 205-1a, a PHY unit 205-1b, and a light emitting element 205-1c. The LINK unit 205-1a and the PHY unit 205-1b perform transmission processing on a transmission signal. The LINK unit 205-1a and the PHY unit 205-1b constitute a transmission processor.

Here, the transmission signal includes the main data signal transmitted via the routing unit 204, and the wake up signal and the path information are included in this order before the main data signal in order to activate a necessary circuit of the following device.

The light emitting element 205-1c converts the transmission signal output from the PHY unit 205-1b from an electrical signal into an optical signal and transmits the optical signal to the following device. The light emitting element 205-1c serves as a transmitter.

Although no detailed description will be given, the signal transmitters 205-2 to 205-N of the switch/router 200 are also similar in configuration to the signal transmitter 205-1.

Figure 10:
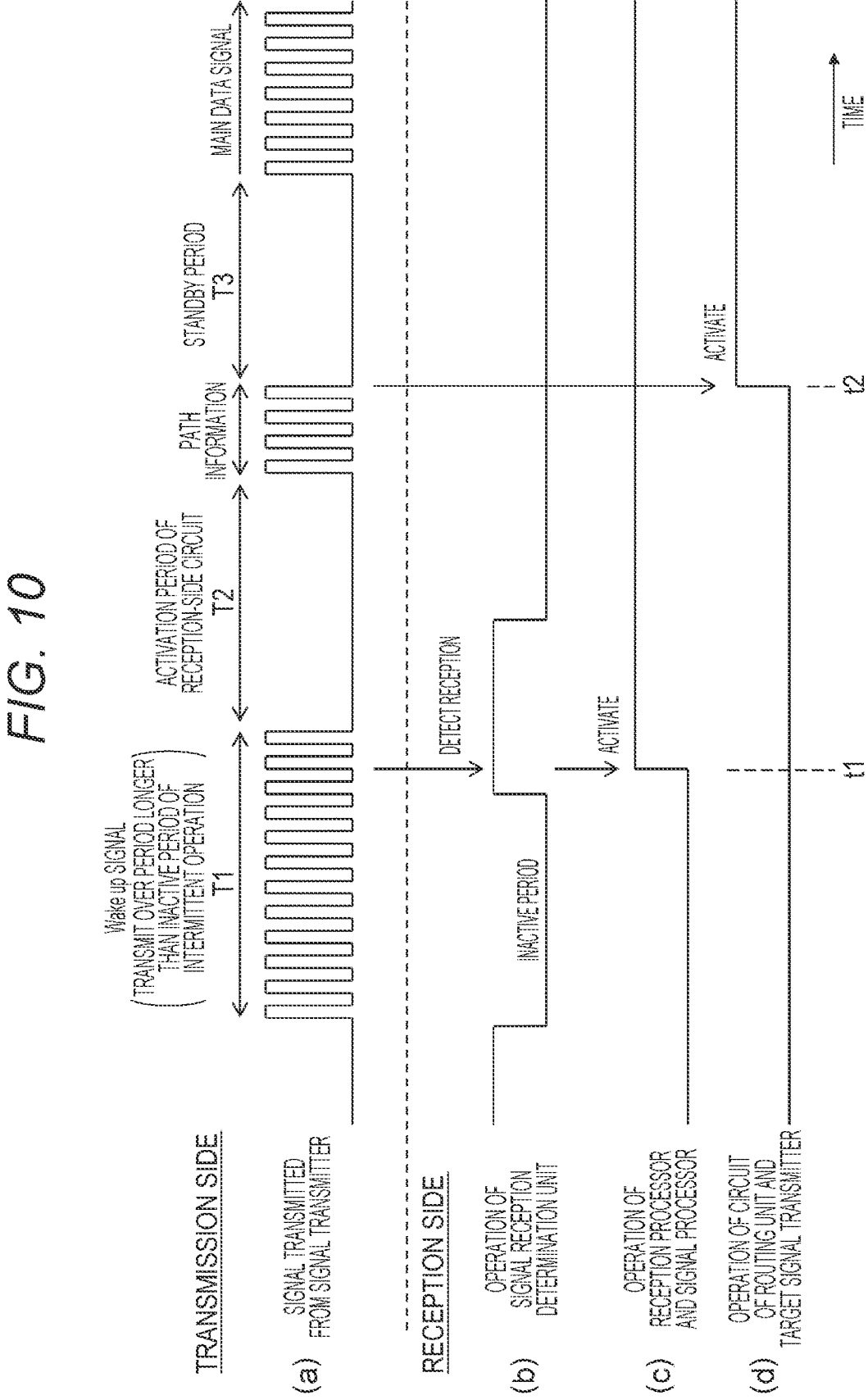
FIG. 10 is a timing chart for describing how the transmission-side device and the switch/router operate.

FIG. 10 is a timing chart for describing how the transmission-side device and the switch/router, here, the device 100-1 and the switch/router 200 in the configuration example illustrated in FIG. 9, operate. FIG. 10(*a*) illustrates a transmission signal transmitted from the device 100-1 to the signal receiver 202-1 of the switch/router 200. The transmission signal includes the wake up signal, the path information, and the main data signal in this order.

FIG. 10(*b*) illustrates how the signal reception determination unit 202-1d operates in the signal receiver 202-1 of the switch router 200 that receives the transmission signal from the device 100-1. Here, the signal reception determination unit 202-1d operates in an intermittent manner so as to reduce power consumption. A transmission period T1 of the wake up signal included in the transmission signal from the device 100-1 is set longer than an inactive period of the intermittent operation of the signal reception determination unit 202-1d.

FIG. 10(*c*) illustrates how the reception processor (the PHY unit 202-1b, the LINK unit 202-1c) of the signal receiver 202-1 and the signal processor 203-1 operate. The reception processor (the PHY unit 202-1*b*, the LINK unit 202-1*c*) and the signal processor 203-1 are activated under the control of the controller 201 at timing t1 when the reception of the wake up signal is detected by the signal reception determination unit 202-1*d*.

A period T2 between the wake up signal and the path information included in the transmission signal from the device 100-1 described above, that is, a standby period from the end of the transmission of the wake up signal to the start of the transmission of the path information, is set to a preset constant period so as to set aside time to activate the reception processor (the PHY unit 202-1*b*, the LINK unit 202-1*c*) and the signal processor 203-1 to start up the circuit.

FIG. 10(*d*) illustrates how the circuit of the routing unit 204 and the signal transmitter (target signal transmitter) corresponding to the path determined by the signal processor 203-1 on the basis of the path information operate. The circuit of the routing unit 204 and the target signal transmitter are activated under the control of the controller 201 at timing t2 when the path is determined by the signal processor 203-1.

A period T3 between the path information and the main data signal included in the transmission signal from the device 100-1, that is, a standby period from the end of the transmission of the path information to the start of the transmission of the main data signal, is set to a preset constant period so as to set aside time to activate the circuit of the routing unit 204 and the target signal transmitter to start up the circuit.

Note that the above-described period T3 may include a period in which all necessary circuits on the path up to the reception-side device are activated and started up. In this case, the switch/router 200 transfers the wake up signal and the path information to the following switch/router, such transfer to the following switch/router being performed one after another, and sequentially starts up necessary circuits on the path so as to finally cause the transmission-side device and the reception-side device to exchange data.

Furthermore, although FIG. 10 illustrates how the transmission-side device and the switch/router operate, the same applies to a certain switch/router and the following switch/router connected to the certain switch/router. Therefore, for example, a relationship among the wake up signal, the path information, and the main data signal transmitted from each of the signal transmitters 205-1, 205-2, . . . , and 205-N of the switch/router 200 to a corresponding following switch/router is also similar to a relationship among the wake up signal, the path information, and the main data signal transmitted from the signal transmitter 101 of the transmission-side device (see FIG. 10(*a*)).

"Configuration Example of Reception-Side Device and Switch/Router Connected to Reception-Side Device"

Figure 11:
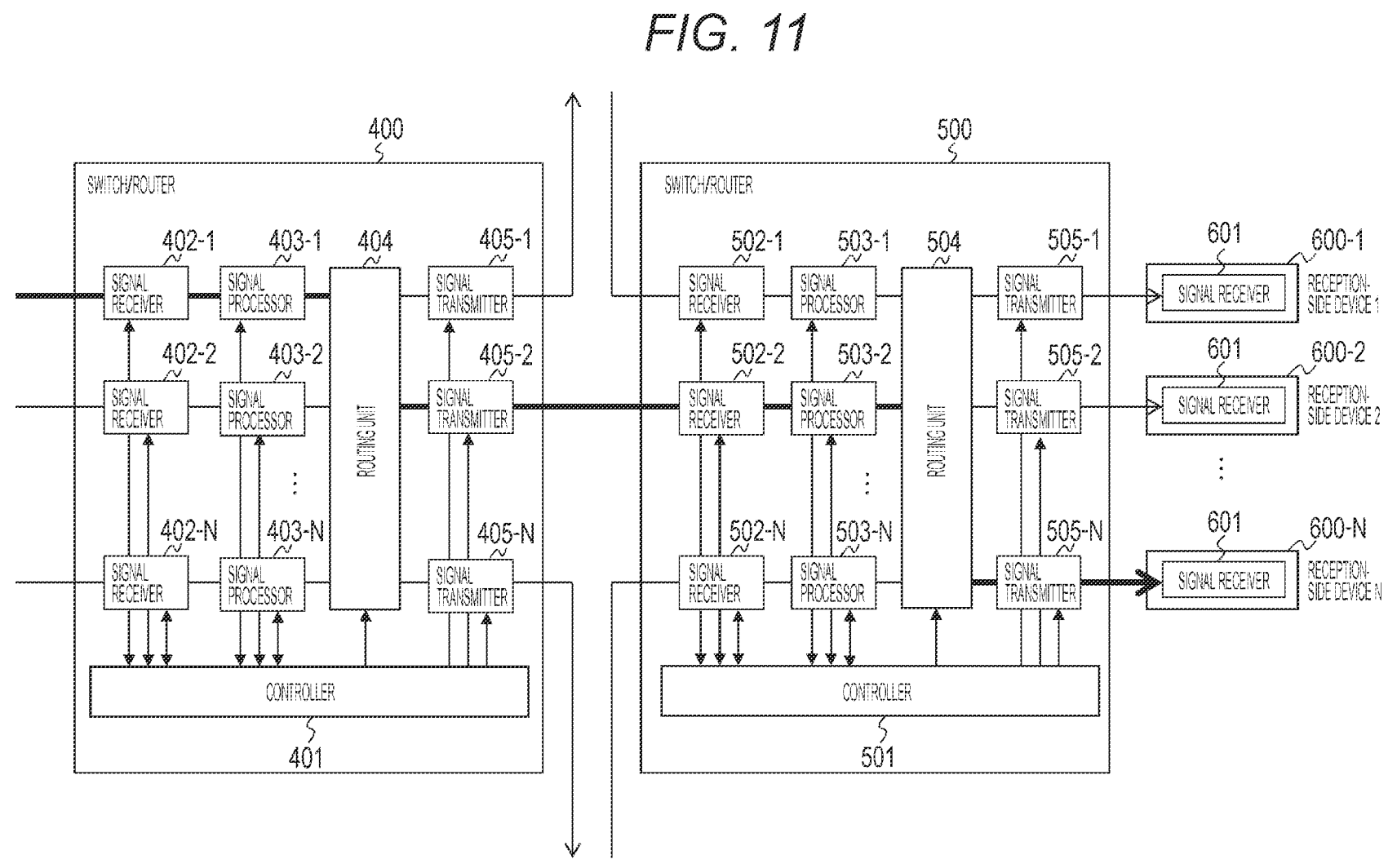

FIG. 11 illustrates a configuration example of a reception-side device (reception device) and a switch/router as a relay device connected to the reception-side device in a case where the new network system as the first embodiment is applied. This configuration example corresponds to the switch/router constituting a large-scale network, the switch/router constituting a medium-scale network, and the reception-side device enclosed by a dashed-line frame Q in the network system illustrated in FIG. 5.

In the configuration example illustrated in FIG. 11, a switch/router 400 is a switch/router constituting a large-scale network. The switch/router 400 includes a controller 401, N signal receivers 402-1, 402-2, . . . , and 402-N, N signal processors 403-1, 403-2, . . . , and 403-N, a routing unit 404, and N signal transmitters 405-1, 405-2, . . . , and 405-N.

The switch/router 400 is similar in configuration to the above-described switch/router 200 illustrated in FIG. 8, so that no detailed description will be given of the switch/router 400. Note that the signal receivers 402-1, 402-2, . . . , and 402-N each receive the optical signal transmitted from another switch/router constituting a medium-scale network or a large-scale network.

Furthermore, in the configuration example illustrated in FIG. 11, a switch/router 500 is a switch/router constituting a medium-scale network. The switch/router 500 includes a controller 501, N signal receivers 502-1, 502-2, . . . , and 502-N, N signal processors 503-1, 503-2, . . . , and 503-N, a routing unit 504, and N signal transmitters 505-1, 505-2, . . . , and 505-N.

The switch/router 500 is similar in configuration to the above-described switch/router 200 illustrated in FIG. 8 except for the content of the optical signal transmitted from the signal transmitters 505-1, 505-2, . . . , and 505-N, so that no detailed description will be given of the switch/router 500. Note that the signal receivers 502-1, 502-2, . . . , and 502-N each receive the optical signal transmitted from another switch/router constituting a medium-scale network or a large-scale network.

The optical signal transmitted from each of the signal output units 205-1, 205-2, . . . , and 205-N of the above-described switch/router 200 illustrated in FIG. 8 includes the wake up signal, the path information, and the main data signal in this order, but the following device of each of the signal transmitters 505-1, 505-2, . . . , and 505-N is a reception-side device, so that the optical signal includes the wake up signal and the main data signal in this order but does not include the path information. Note that the path information may be included next to the wake up signal.

Furthermore, in the configuration example illustrated in FIG. 11, N devices 600-1, 600-2, . . . , and 600-N are reception-side devices belonging to different users. Each device includes a signal receiver 601 that receives the optical signal. The devices 600-1, 600-2, . . . , and 600-N each receive the optical signal transmitted from a corresponding one of the signal transmitters 505-1, 505-2, . . . , and 505-N of the switch/router 500, and perform, on the main data signal included in the signal thus received, reception processing, such as recording processing or display processing in a case where the main data signal is video data, for example.

In the example configuration illustrated in FIG. 11, for example, a signal received by the signal receiver 402-1 of the switch/router 400 is transmitted from the signal transmitter 405-2 of the switch/router 400 to the switch/router 500. The signal transmitted from the signal transmitter 405-2 of the switch/router 400 is then received by the signal receiver 502-2 of the switch/router 500 and transmitted from the signal transmitter 505-N of the switch/router 500 to the device 600-N.

Figure 12:
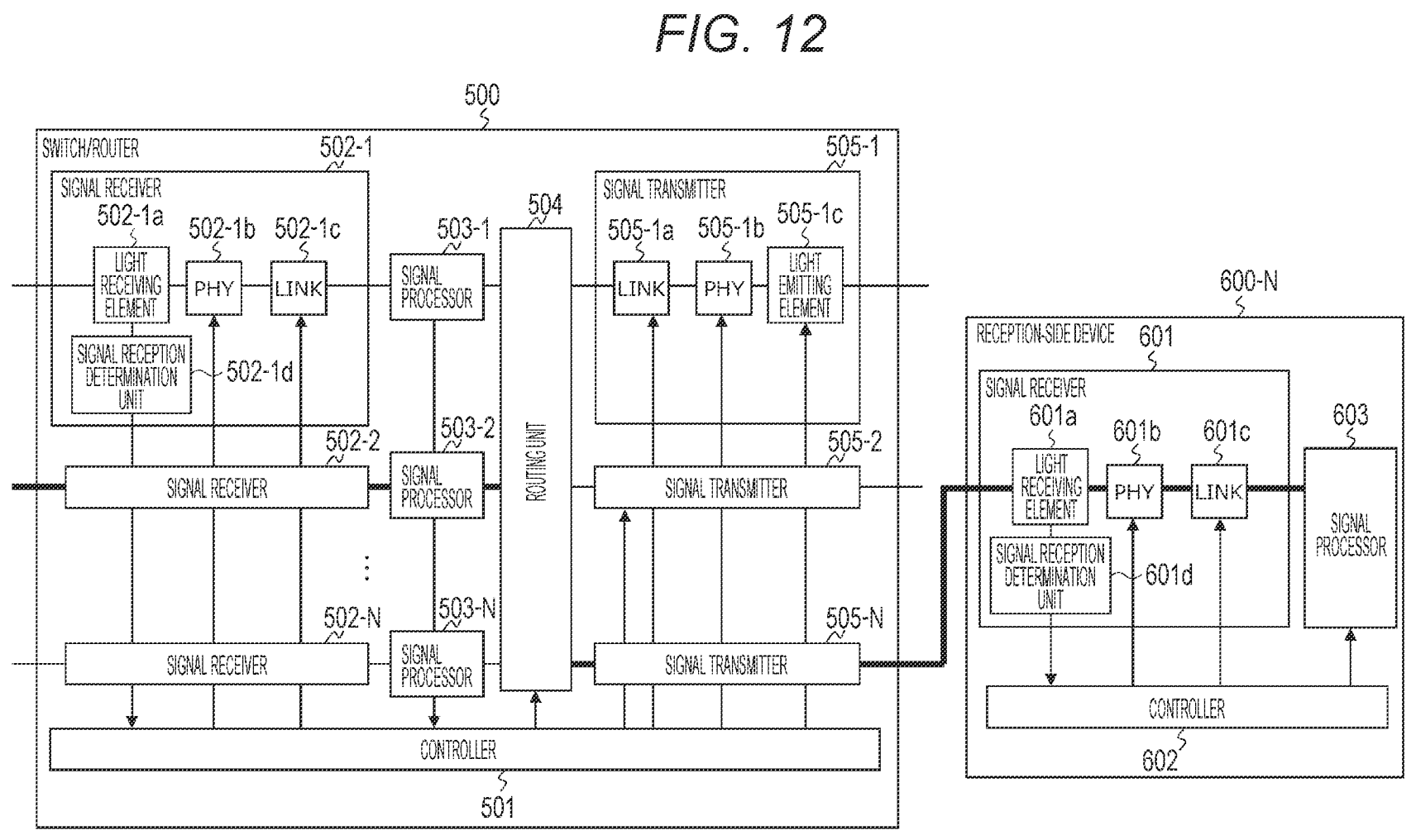

FIG. 12 illustrates a more specific configuration example of the switch/router 500 and the device 600-N. Note that the devices 600-1 to 600-(N−1) are not illustrated but are similar in configuration to the device 600-N.

The signal receiver 502-1 of the switch/router 500 receives the optical signal transmitted from another switch/router constituting a medium-scale network or a large-scale network. The optical signal includes the wake up signal, the path information, and the main data signal in this order (see FIG. 10(*a*)).

The signal receiver 502-1 includes a light receiving element 502-1a, a PHY unit 502-1b, a LINK unit 502-1c, and a signal reception determination unit 502-1d. The light receiving element 502-1a receives the transmitted optical signal and converts the optical signal into an electrical signal. The light receiving element 502-1a serves as a receiver. The PHY unit 502-1b and the LINK unit 502-1c perform reception processing on the signal output from the light receiving element 502-1a and transmit the signal to the signal processor 503-1. The PHY unit 502-1b and the LINK unit 502-1c constitute a reception processor.

The signal reception determination unit 502-1d determines whether the wake up signal has been received on the basis of the signal output from the light receiving element 502-1a, and transmits a result of the determination to the controller 501. The controller 501 activates, on the basis of the result of determination that the wake up signal has been received, the PHY unit 502-1b, the LINK unit 502-1c of the signal receiver 502-1, and the signal processor 503-1 that are in the standby state.

The signal processor 503-1 thus activated selects a path on the basis of the path information next to the wake up signal in the signal output from the signal receiver 502-1, and transmits a result of the selection to the controller 501. The controller 501 activates, on the basis of the path selected by the signal processor 503-1, the circuit of the routing unit 504 and a signal transmitter (target signal transmitter) that are in the standby state and correspond to the path.

Accordingly, the main data signal next to the path information in the signal output from the signal receiver 502-1 is transmitted to the signal transmitter (target signal transmitter) corresponding to the path, and is transmitted from the target signal transmitter to the following device an optical signal. Note that, in this case, the signal transmitted from the target signal transmitter to the following device includes the wake up signal before the main data signal in order to activate a necessary circuit of the following device.

Although no detailed description will be given, the signal receivers 502-2 to 502-N of the switch/router 500 are similar in configuration to the signal receiver 502-1.

Furthermore, the signal transmitter 505-1 of the switch/router 500 includes a LINK unit 505-1a, a PHY unit 505-1b, and a light emitting element 505-1c. The LINK unit 505-1a and the PHY unit 505-1b perform transmission processing on a transmission signal. The LINK unit 505-1a and the PHY unit 505-1b constitute a transmission processor.

Here, the transmission signal includes the main data signal transmitted via the routing unit 504, and the wake up signal and the path information are included before the main data signal in order to activate a necessary circuit of the following reception-side device.

The light emitting element 505-1c converts the transmission signal output from the PHY unit 505-1b from an electrical signal into an optical signal and transmits the optical signal to the following device.

Although no detailed description will be given, the signal transmitters 505-2 to 505-N of the switch/router 500 are also similar in configuration to the signal transmitter 505-1.

The device 600-N includes a controller 602 and a signal processor 603 in addition to the above-described signal receiver 601. The controller 602 controls how each component of the device 600-N operates. The signal processor 603 performs the reception processing on the main data signal received as described above. The signal receiver 601 transmits the optical signal as described above. The signal receiver 601 includes a light receiving element 601a, a PHY unit 601b, a LINK unit 601c, and a signal reception determination unit 601d.

The light receiving element 601a receives the transmitted optical signal and converts the optical signal into an electrical signal. The light receiving element 601a serves as a receiver. The PHY unit 601b and the LINK unit 601c perform reception processing on the signal output from the light receiving element 601a and transmit the signal to the signal processor 603. The PHY unit 601b and the LINK unit 601c constitute a reception processor.

The signal reception determination unit 601d determines whether the wake up signal has been received on the basis of the signal output from the light receiving element 601a, and transmits a result of the determination to the controller 602. The controller 602 activates, on the basis of the result of determination that the wake up signal has been received, the PHY unit 601b, the LINK unit 601c of the signal receiver 601, and the signal processor 603 that are in the standby state.

The signal processor 603 performs the reception processing on the main data signal included in the signal received by the signal receiver 601, such as recording processing or display processing in a case where the main data signal is video data, for example.

As described above, the transmission-side devices constituting the network system transmit the wake up signal, the path information, and the main data signal in this order. It is therefore possible to sequentially activate the relay devices on a path and finally cause the reception device to receive the main data signal, which allows a reduction in power consumed by the relay devices and the reception device for device-to-device communications over the network.

Furthermore, each relay device (switch/router) constituting the network system receives the wake up signal, the path information, and the main data signal in this order, activates the reception processor of the signal receiver and the signal processor (path selector) on the basis of the result of determination that the wake up signal has been received, activates, on the basis of the path determined by the signal processor, the circuit of the routing unit and the target signal transmitter corresponding to the path, and outputs the wake up signal, the path information, and the main data signal in this order from the activated target signal transmitter. It is therefore possible to sequentially activate the relay devices on the path, which allows a reduction in power consumed by the relay devices for device-to-device communications over the network.

Furthermore, the reception-side device constituting the network system receives the wake up signal and the main data signal in this order, and activates the reception processor of the signal receiver and the signal processor on the basis of the result of determination that the wake up signal has been received. It is therefore possible to reduce power consumed by the reception device for device-to-device communications over the network.

2. Second Embodiment

In the first embodiment described above, the period T3 between the path information and the main data signal included in the transmission signal from each of the transmission-side devices 100-1, 100-2, . . . , and 100-N may include a switch activation period up to the reception-side device.

Another configuration, however, is conceivable where the transmission-side devices 100-1, 100-2, . . . , and 100-N each start to transmit the main data signal before selecting a path on the basis of the path information and activating the circuit of the routing unit 204 and the target signal transmitter corresponding to the path in the following switch/router 200.

Figure 13:
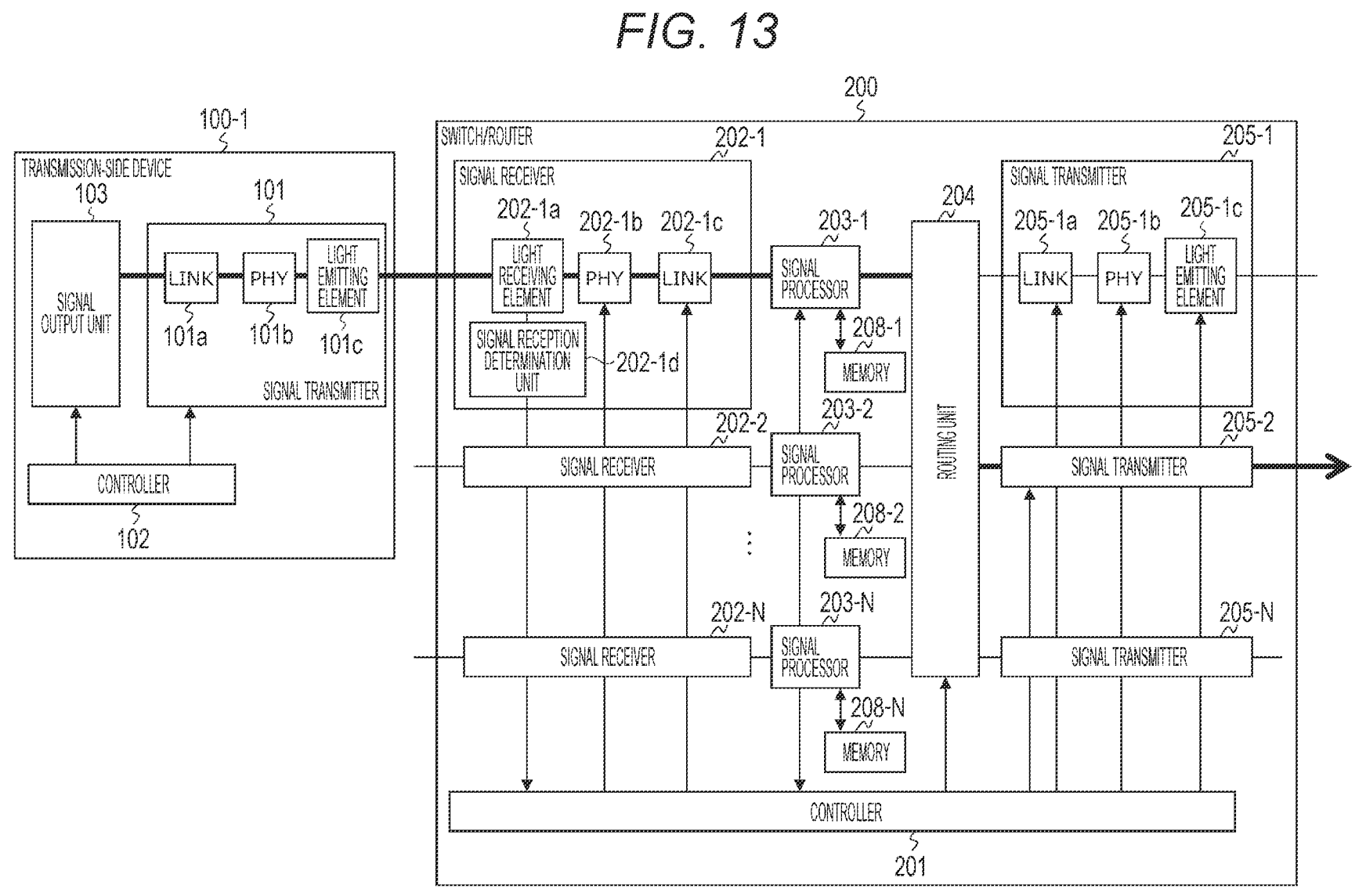

FIG. 13 illustrates a configuration example of a transmission-side device (transmission device) and a switch/router as a relay device connected to the transmission-side device in a case where a new network system as a second embodiment is applied. In FIG. 13, components corresponding to the components illustrated in FIG. 9 will be denoted by the same reference numerals, and no detailed description will be given of such components as appropriate. In the switch/router 200, memories 208-1, 208-2, . . . , and 208-N each serving as a storage for temporarily storing the main data signal are provided downstream of the signal receivers 202-1, 202-2, . . . , and 202-N, respectively.

The main data signal included in the signal output from each of the signal receivers 202-1, 202-2, . . . , and 202-N is stored in a corresponding one of the memories 208-1, 208-2, . . . , and 208-N via a corresponding one of the signal processors 203-1, 203-2, . . . , and 203-N. Then, after the circuit of the routing unit and the target signal transmitter corresponding to the path selected on the basis of the path information are activated, the main data signal stored in each of the memories 208-1, 208-2, . . . , and 208-N is read and transmitted to the target signal transmitter in which the wake up signal and the path information are added to the main data signal and is then transmitted to the following switch/router.

3. Third Embodiment

In the first embodiment described above, the transmission-side devices 100-1, 100-2, . . . , and 100-N are configured to wait for a certain period of time in order to set aside time to activate the reception processors (the PHY unit 202-1*b*, the LINK unit 202-1*c*) of the signal receivers 202-1, 202-2, . . . , and 202-N and the signal processors 203-1, 203-2, . . . , and 203-N in the switch/router 200 between the end of transmission of the wake up signal and the start of transmission of the path information (see the period T2 illustrated in FIG. 10).

Furthermore, similarly, in the above-described embodiments, the transmission-side devices 100-1, 100-2, . . . , and 100-N may add the switch activation period up to the reception-side device to the period from the end of transmission of the path information to the start of transmission of the main data signal (see the period T3 illustrated in FIG. 10).

In this case, a configuration is conceivable where the switch/router 200 notifies the transmission-side devices 100-1, 100-2, . . . , and 100-N that necessary circuits have been activated to make the transmission of the path information and the main data signal possible. The same applies to switch/router-to-switch/router communications and to switch/router-to-reception-side device communications. "Configuration Example of Transmission-Side Device and Switch/Router Connected to Transmission-Side Device"

Figure 14:
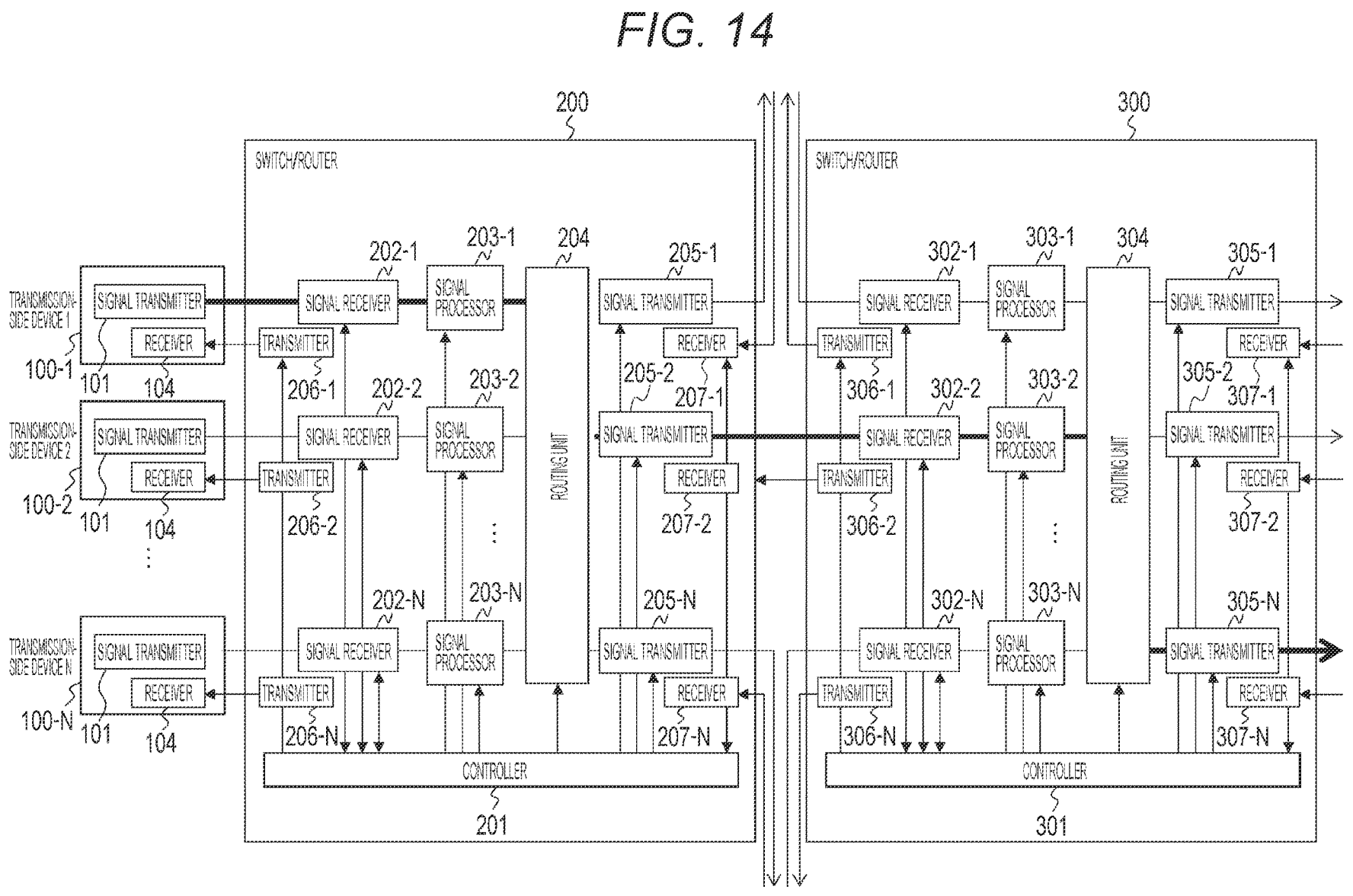

FIG. 14 illustrates a configuration example of a transmission-side device (transmission device) and a switch/router as a relay device connected to the transmission-side device in a case where a new network system as the third embodiment is applied. This configuration example corresponds to the transmission-side device, the switch/router constituting a medium-scale network, and the switch/router constituting a large-scale network enclosed by the dashed-line frame P in the network system illustrated in FIG. 5. In FIG. 14, components corresponding to the components illustrated in FIG.

8 will be denoted by the same reference numerals, and no detailed description will be given of such components as appropriate.

In the configuration example illustrated in FIG. 14, N devices 100-1, 100-2, . . . , and 100-N are transmission-side devices belonging to different users. Each device includes a signal transmitter 101 that transmits an optical signal and a receiver 104. Here, the optical signal output from the signal transmitter 101 includes a wake up signal, path information, and a main data signal in this order.

The receiver 104 receives a reception notification transmitted from a corresponding transmitter of the switch/router 200 after the signal transmitter 101 starts to transmit the wake up signal. In this case, the corresponding transmitter of the switch/router 200 transmits this reception notification after the wake up signal is received by the signal receiver, and the reception processor of the signal receiver and the signal processor are activated. After the reception notification is received by the receiver 104, the signal transmitter 101 stops the transmission of the wake up signal and starts to transmit the path information.

Furthermore, the receiver 104 receives a ready notification transmitted from the corresponding transmitter of the switch/router 200 after the signal transmitter 101 stops the transmission of the path information. In this case, the corresponding transmitter of the switch/router 200 transmits this ready notification after the signal processor selects a path on the basis of the path information, and the circuit of the routing unit 204 and the signal transmitter (target signal transmitter) corresponding to the path are activated. The signal transmitter 101 starts to transmit the main data signal after the receiver 104 receives the ready notification.

Furthermore, in the configuration example illustrated in FIG. 14, the switch/router 200 is a switch/router constituting a medium-scale network. The switch/router 200 includes a controller 201, N signal receivers 202-1, 202-2, . . . , and 202-N, N signal processors 203-1, 203-2, . . . , and 203-N, a routing unit 204, N signal transmitters 205-1, 205-2, . . . , and 205-N, N transmitters 206-1, 206-2, . . . , and 206-N respectively corresponding to the signal receivers 202-1, 202-2, . . . , and 202-N, and N receivers 207-1, 207-2, . . . , and 207-N respectively corresponding to the signal receivers 205-1, 205-2, . . . , and 205-N.

The transmitters 206-1, 206-2, . . . , and 206-N each transmit the reception notification to a corresponding transmission-side device after a corresponding signal receiver receives the wake up signal, and the reception processor of the signal receiver and a corresponding signal processor are activated to start up the circuit. Furthermore, the transmitters 206-1, 206-2, . . . , and 206-N each transmit the ready notification to a corresponding transmission-side device after a corresponding signal processor selects a path on the basis of the path information, and the circuit of the routing unit and the signal transmitter (target signal transmitter) corresponding to the path are activated.

The receivers 207-1, 207-2, . . . , and 207-N each receive the reception notification transmitted from a corresponding transmitter of a switch/router after a corresponding signal transmitter starts to transmit the wake up signal. In this case, the corresponding transmitter of the switch/router transmits this reception notification after a corresponding signal receiver receives the wake up signal, and the reception processor of the signal receiver and a corresponding signal processor are activated. The signal transmitter corresponding to each of the receivers 207-1, 207-2, . . . , and 207-N stops the transmission of the wake up signal and starts to transmit the path information after the receiver receives the reception notification.

Furthermore, the receivers 207-1, 207-2, . . . , and 207-N each receive the ready notification transmitted from the corresponding transmitter of the switch/router after a corresponding one of the signal transmitters 205-1, 205-2, . . . , and 205-N stops the transmission of the path information. In this case, the corresponding transmitter of the switch/router transmits this ready notification after a corresponding signal processor selects a path on the basis of the path information, and the circuit of the routing unit 304 and the signal transmitter (target signal transmitter) corresponding to the path are activated. The signal transmitter corresponding to each of the receivers 207-1, 207-2, . . . , and 207-N starts to transmit the main data signal after the receiver receives the reception notification.

Although no detailed description will be given, the rest of the switch/router 200 is similar in configuration to the switch/router 200 illustrated in FIG. 8.

Furthermore, in the configuration example illustrated in FIG. 14, a switch/router 300 is a switch/router constituting a large-scale network. The switch/router 300 includes a controller 301, N signal receivers 302-1, 302-2, . . . , and 302-N, N signal processors 303-1, 303-2, . . . , and 303-N, a routing unit 304, N signal transmitters 305-1, 305-2, . . . , and 305-N, N transmitters 306-1, 306-2, . . . , and 306-N respectively corresponding to the signal receivers 302-1, 302-2, . . . , and 302-N, and N receivers 307-1, 307-2, . . . , and 307-N respectively corresponding to the signal receivers 305-1, 305-2, . . . , and 305-N. The switch/router 300 is similar in configuration to the above-described switch/router 200, so that no detailed description will be given of the switch/router 300.

Figure 15:
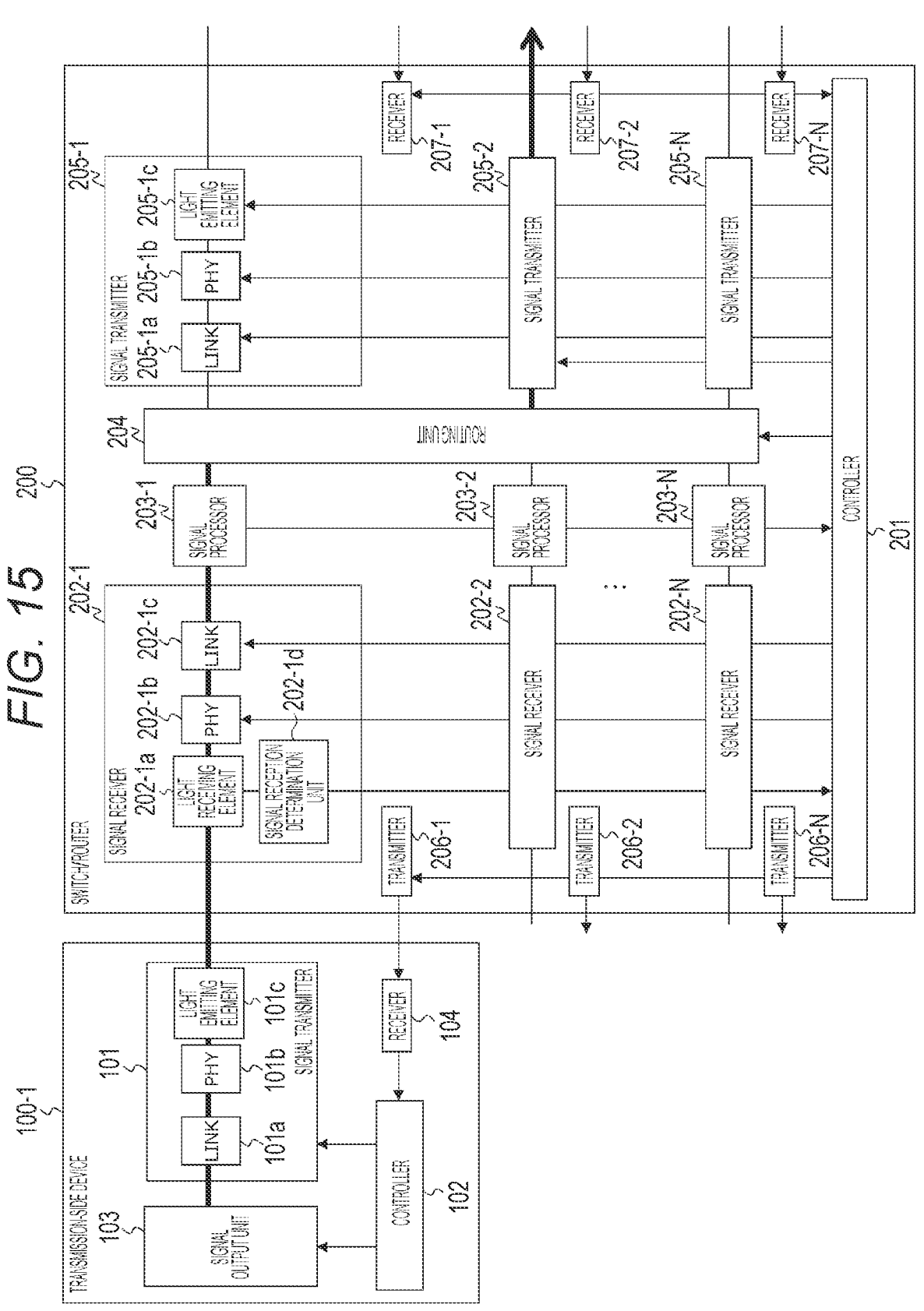
FIG. 15 is a diagram illustrating a more specific configuration example of the transmission-side device and the switch/router.

FIG. 15 illustrates a more specific configuration example of the device 100-1 and the switch/router 200 illustrated in FIG. 14. Note that the devices 100-2 to 100-N are not illustrated but are similar in configuration to the device 100-1. In FIG. 15, components corresponding to the components illustrated in FIGS. 9 and 14 will be denoted by the same reference numerals, and no detailed description will be given of such components as appropriate.

The device 100-1 includes a controller 102 and a signal output unit 103 in addition to the above-described signal transmitter 101 and the receiver 104. The controller 102 controls how each component of the device 101-1 operates. The signal output unit 103 outputs a signal to be transmitted to the switch/router 200. This signal includes the wake up signal, the path information, and the main data signal in this order.

The signal transmitter 101 transmits the optical signal as described above. The signal transmitter 101 includes a LINK unit 101a, a PHY unit 101b, and a light emitting element 101c. The LINK unit 101a and the PHY unit 101b perform transmission processing on the signal output from the signal output unit 103. The LINK unit 101a and the PHY unit 101b constitute a transmission processor.

The light emitting element 101c converts the signal output from the PHY unit 101b from an electrical signal into an optical signal and transmits the optical signal to the switch/ router 200. The light emitting element 101c serves as a transmitter.

The receiver 104 receives, after the signal transmitter 101 starts to transmit the wake up signal to the signal receiver 202-1 of the switch/router 200, the reception notification transmitted from the transmitter 206-1 corresponding to the signal receiver 202-1. In this case, the transmitter 206-1 transmits the reception notification after the signal receiver 202-1 receives the wake up signal, the reception processor (PHY unit, LINK unit) of the signal receiver 202-1 and the signal processor 203-1 are activated to start up the circuit.

The receiver 104 notifies the controller 102 that the reception notification has been received. The controller 102 controls the signal output unit 103 on the basis of this notification to stop the output of the wake up signal and start to output the path information. This causes the signal transmitter 101 to stop the transmission of the wake up signal and start to transmit the path information.

Furthermore, the receiver 104 receives, after the signal transmitter 101 stops the transmission of the path information to the signal receiver 202-1 of the switch/router 200, the ready notification transmitted from the transmitter 206-1 corresponding to the signal receiver 202-1. In this case, the transmitter 206-1 transmits this ready notification after the signal processor 203-1 selects a path on the basis of the path information, and the circuit of the routing unit 204 and the signal transmitter (target signal transmitter) corresponding to the path are activated.

The receiver 104 notifies the controller 102 that the ready notification has been received. The controller 102 controls the signal output unit 103 on the basis of this notification to start to output the main data signal. This causes the signal transmitter 101 to start to transmit the main data signal.

The signal receiver 202-1 of the switch/router 200 receives the optical signal transmitted from the device 100-1 as described above. The signal receiver 202-1 includes a light receiving element 202-1a, a PHY unit 202-1b, a LINK unit 202-1c, and a signal reception determination unit 202-1d. The light receiving element 202-1a receives the optical signal transmitted from the device 100-1 and converts the optical signal into an electrical signal. The light receiving element 202-1a serves as a receiver.

The PHY unit 202-1b and the LINK unit 202-1c perform reception processing on the signal output from the light receiving element 202-1a and transmit the signal to the signal processor 203-1. The PHY unit 202-1b and the LINK unit 202-1c constitute a reception processor. The signal reception determination unit 202-1d determines whether the wake up signal has been received on the basis of the signal output from the light receiving element 202-1a, and transmits a result of the determination to the controller 201.

The controller 201 activates, on the basis of the result of determination that the wake up signal has been received, the reception processor (the PHY unit, the LINK unit) of the signal receiver 202-1 and the signal processor 203-1 that are in the standby state to bring the reception processor and the signal processor 203-1 into the active state. Furthermore, after the reception processor (PHY unit, LINK unit) and the signal processor 203-1 are activated to start up the circuit, the controller 201 controls the transmitter 206-1 corresponding to the signal receiver 202-1 to transmit the reception notification to the receiver 104 of the device 100-1.

Furthermore, the signal processor 203-1 thus activated selects a path on the basis of the path information next to the wake up signal in the signal output from the signal receiver 202-1, and transmits a result of the selection to the controller 201. The controller 201 activates, on the basis of the path selected by the signal processor 203-1, the circuit of the routing unit 204 and the signal transmitter (target signal transmitter) that are in the standby state and correspond to the path to bring the circuit and the signal transmitter into the active state.

Accordingly, the main data signal next to the path information in the signal output from the signal receiver 202-1 is transmitted to the signal transmitter (target signal transmitter) corresponding to the path, and is transmitted from the target signal transmitter to the following device as an optical signal. Note that, in this case, the signal transmitted from the target signal transmitter to the following device includes the wake up signal and the path information in this order before the main data signal in order to activate a necessary circuit of the following device.

Furthermore, after the circuit of the routing unit 204 and the signal transmitter (target signal transmitter) corresponding to the path are activated to start up the circuit, the controller 201 controls the transmitter 206-1 corresponding to the signal receiver 202-1 to transmit the ready notification to the receiver 104 of the device 100-1.

Although no detailed description will be given, the signal receivers 202-2 to 202-N of the switch/router 200 are similar in configuration to the signal receiver 202-1, and the transmitters 206-2 to 206-N are similar in configuration to the transmitter 206-1.

Furthermore, the signal transmitter 205-1 of the switch/router 200 includes a LINK unit 205-1$a$, a PHY unit 205-1$b$, and a light emitting element 205-1$c$. The LINK unit 205-1$a$ and the PHY unit 205-1$b$ perform transmission processing on a transmission signal. The LINK unit 205-1$a$ and the PHY unit 205-1$b$ constitute a transmission processor.

The light emitting element 205-1$c$ converts the transmission signal output from the PHY unit 205-1$b$ from an electrical signal into an optical signal and transmits the optical signal to the following device. The light emitting element 205-1$c$ serves as a transmitter. Here, the transmission signal includes the main data signal transmitted via the routing unit 204, and the wake up signal and the path information are included in this order before the main data signal in order to activate a necessary circuit of the following device.

After the signal transmitter 205-1 starts to transmit the wake up signal, the receiver 207-1 receives the reception notification transmitted from a corresponding transmitter of a switch/router. In this case, the corresponding transmitter of the switch/router transmits this reception notification after a corresponding signal receiver receives the wake up signal, and the reception processor of the signal receiver and a corresponding signal processor are activated.

The receiver 207-1 notifies the controller 201 that the reception notification has been received. The controller 201 controls the signal transmitter 205-1 on the basis of this notification to stop the transmission of the wake up signal and start to transmit the path information.

Furthermore, after the signal transmitter 205-1 stops the transmission of the path information, the receiver 207-1 receives the ready notification transmitted from the corresponding transmitter of the switch/router. In this case, after the signal processor selects a path on the basis of the path information, and the circuit of the routing unit and the signal transmitter (target signal transmitter) corresponding to the path are activated, the corresponding transmitter of the switch/router transmits this ready notification.

The receiver 207-1 notifies the controller 201 that the ready notification has been received. The controller 201 controls, on the basis of this notification, the signal transmitter 205-1 to start to transmit the main data signal.

Although no detailed description will be given, the signal transmitters 205-2 to 205-N of the switch/router 200 are similar in configuration to the signal transmitter 205-1, and the receivers 207-2 to 207-N are similar in configuration to the receiver 207-1.

Figure 16:
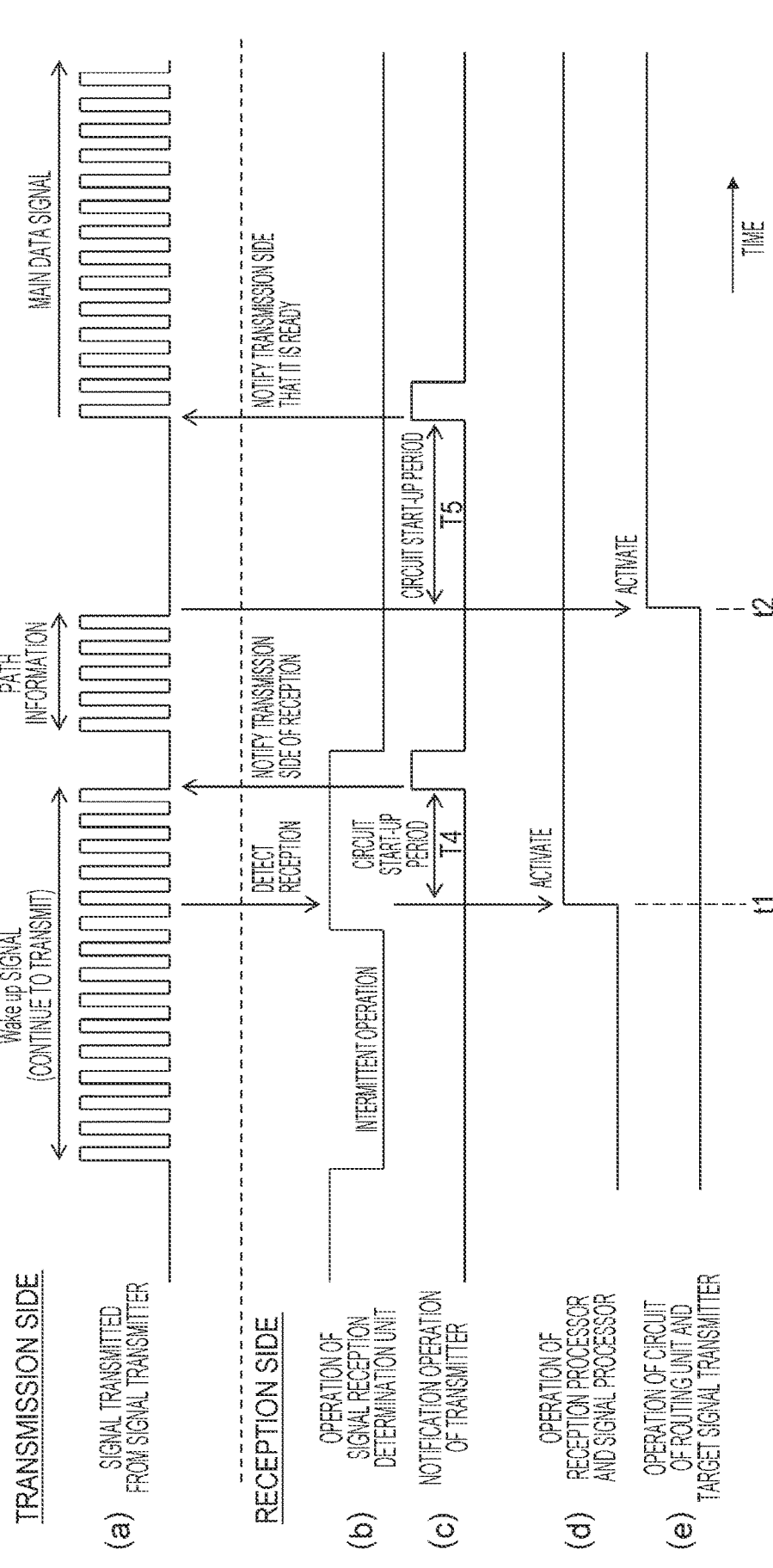
FIG. 16 is a timing chart for describing how the transmission-side device and the switch/router operate.

FIG. 16 is a timing chart for describing how the transmission-side device and the switch/router, here, the device 100-1 and the switch/router 200 in the configuration example illustrated in FIG. 15, operate. FIG. 16($a$) illustrates a transmission signal transmitted from the device 100-1 to the signal receiver 202-1 of the switch/router 200. The transmission signal includes the wake up signal, the path information, and the main data signal in this order.

FIG. 16($b$) illustrates how the signal reception determination unit 202-1$d$ operates in the signal receiver 202-1 of the switch router 200 that receives the transmission signal from the device 100-1. Here, the signal reception determination unit 202-1$d$ operates in an intermittent manner so as to reduce power consumption.

FIG. 16($d$) illustrates how the reception processor (the PHY unit 202-1$b$, the LINK unit 202-1$c$) of the signal receiver 202-1 and the signal processor 203-1 operate. The reception processor (the PHY unit 202-1$b$, the LINK unit 202-1$c$) and the signal processor 203-1 are activated under the control of the controller 201 at timing t1 when the reception of the wake up signal is detected by the signal reception determination unit 202-1$d$.

FIG. 16($e$) illustrates how the circuit of the routing unit 204 and the signal transmitter (target signal transmitter) corresponding to the path selected by the signal processor 203-1 on the basis of the path information operate. The circuit of the routing unit 204 and the target signal transmitter are activated under the control of the controller 201 at timing t2 when the path is selected by the signal processor 203-1.

FIG. 16($c$) illustrates how the transmitter 206-1 corresponding to the signal receiver 202-1 of the switch/router 200 makes notification. After the reception processor (the PHY unit 202-1$b$, the LINK unit 202-1$c$) and the circuit of the signal processor 203-1 activated at the timing t1 when the signal reception determination unit 202-1$d$ detects the reception of the wake up signal are started up, that is, after a circuit start-up period T4 passes from the timing t1, the transmitter 206-1 transmits the reception notification to the receiver 104 of the device 100-1.

As described above, the transmission of the reception notification to the receiver 104 of the device 100-1 causes the receiver 104 to notify the controller 102 that the reception notification has been received. The controller 102 controls the signal output unit 103 on the basis of this notification to stop the output of the wake up signal and start to output the path information. This causes the signal transmitter 101 to stop the transmission of the wake up signal and start to transmit the path information.

Furthermore, after the circuit of the routing unit 204 and the circuit of the signal transmitter (target signal transmitter) corresponding to the path selected on the basis of the path information and activated at the timing t2 are started up, that is, after a circuit start-up period T5 passes from the timing t2, the transmitter 206-1 transmits the ready notification to the receiver 104 of the device 100-1.

As described above, the transmission of the ready notification to the receiver 104 of the device 100-1 causes the receiver 104 to notify the controller 102 that the ready notification has been received. The controller 102 controls the signal output unit 103 on the basis of this notification to start to output the main data signal. This causes the signal transmitter 101 to start to transmit the main data signal.

Note that the above-described period T5 may include a period in which all necessary circuits on the path up to the reception-side device are activated and started up. In this case, the switch/router 200 transfers the wake up signal and the path information to the following switch/router, such transfer to the following switch/router being performed one after another, sequentially starts up necessary circuits on the path, and sequentially receives, as feedback, the ready notification from the last switch/router, so that the transmission-side device 100-1 detects that all the circuits on the path have been started up and can transmit the main data signal.

Furthermore, although FIG. 16 illustrates how the transmission-side device and the switch/router operate, the same applies to a certain switch/router and the following switch/router connected to the certain switch/router. Therefore, for example, a relationship among the wake up signal, the path information, and the main data signal transmitted from each of the signal transmitters 205-1, 205-2, . . . , and 205-N of the switch/router 200 to a corresponding following switch/router is also similar to a relationship among the wake up signal, the path information, and the main data signal transmitted from the signal transmitter 101 of the transmission-side device (see FIG. 16(a)).

"Configuration Example of Reception-Side Device and Switch/Router Connected to Reception-Side Device"

Figure 17:
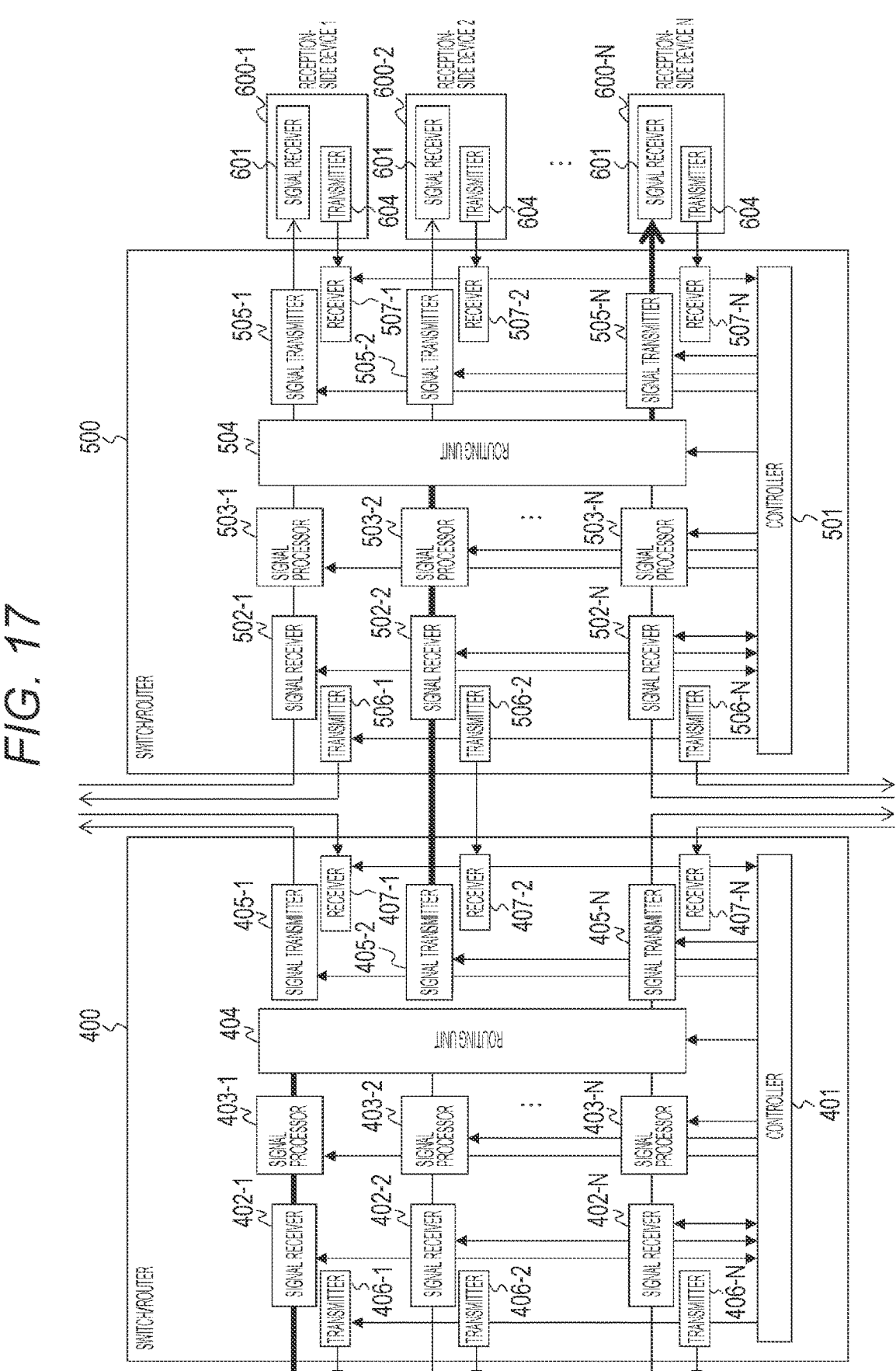
FIG. 17 is a diagram illustrating a configuration example of a reception-side device and a switch/router as a relay device connected to the reception-side device in a case where the new network system as the third embodiment is applied.

FIG. 17 illustrates a configuration example of a reception-side device (reception device) and a switch/router as a relay device connected to the reception-side device in a case where the new network system as the third embodiment is applied. This configuration example corresponds to the switch/router constituting a large-scale network, the switch/router constituting a medium-scale network, and the reception-side device enclosed by the dashed-line frame Q in the network system illustrated in FIG. 5. In FIG. 17, components corresponding to the components illustrated in FIG. 11 will be denoted by the same reference numerals, and no detailed description will be given of such components as appropriate.

In the configuration example illustrated in FIG. 17, a switch/router 400 is a switch/router constituting a large-scale network. The switch/router 400 includes a controller 401, N signal receivers 402-1, 402-2, . . . , and 402-N, N signal processors 403-1, 403-2, . . . , and 403-N, a routing unit 404, N signal transmitters 405-1, 405-2, . . . , and 405-N, N transmitters 406-1, 406-2, . . . , and 406-N respectively corresponding to the signal receivers 402-1, 402-2, . . . , and 402-N, and N receivers 407-1, 407-2, . . . , and 407-N respectively corresponding to the signal receivers 405-1, 405-2, . . . , and 405-N.

The switch/router 400 is similar in configuration to the above-described switch/router 200 illustrated in FIG. 14, so that no detailed description will be given of the switch/router 400. Note that the signal receivers 402-1, 402-2, . . . , and 402-N each receive the optical signal transmitted from another switch/router constituting a medium-scale network or a large-scale network.

Furthermore, in the configuration example illustrated in FIG. 17, a switch/router 500 is a switch/router constituting a medium-scale network. The switch/router 500 includes a controller 501, N signal receivers 502-1, 502-2, . . . , and 502-N, N signal processors 503-1, 503-2, . . . , and 503-N, a routing unit 504, N signal transmitters 505-1, 505-2, . . . , and 505-N, N transmitters 506-1, 506-2, . . . , and 506-N respectively corresponding to the signal receivers 502-1, 502-2, . . . , and 502-N, and N receivers 507-1, 507-2, . . . , and 507-N respectively corresponding to the signal receivers 505-1, 505-2, . . . , and 505-N.

The switch/router 500 is similar in configuration to the above-described switch/router 200 illustrated in FIG. 14 except for the content of the optical signal transmitted from the signal transmitters 505-1, 505-2, . . . , and 505-N, so that no detailed description will be given of the switch/router 500. Note that the signal receivers 502-1, 502-2, . . . , and 502-N each receive the optical signal transmitted from another switch/router constituting a medium-scale network or a large-scale network.

The optical signal transmitted from each of the signal output units 205-1, 205-2, . . . , and 205-N of the above-described switch/router 200 illustrated in FIG. 14 includes the wake up signal, the path information, and the main data signal in this order, but the following device of each of the signal transmitters 505-1, 505-2, . . . , and 505-N is a reception-side device, so that the optical signal includes the wake up signal and the main data signal in this order but does not include the path information.

Furthermore, in the configuration example illustrated in FIG. 17, N devices 600-1, 600-2, . . . , and 600-N are reception-side devices belonging to different users. Each device includes a signal receiver 601 that receives an optical signal and a transmitter 604 that transmits a notification to a corresponding receiver of the switch/router 500.

Each device receives the optical signal transmitted from a corresponding signal transmitter of the switch/router 500, and performs, on the main data signal included in the signal thus received, reception processing, such as recording processing or display processing in a case where the main data signal is video data, for example. After the signal receiver 601 receives the wake up signal, and a reception processor included in the signal receiver 601 and a signal processor that performs the reception processing on the received main data signal are activated to start up the circuit, the transmitter 604 transmits the ready notification to the corresponding receiver of the switch/router 500.

Figure 18:
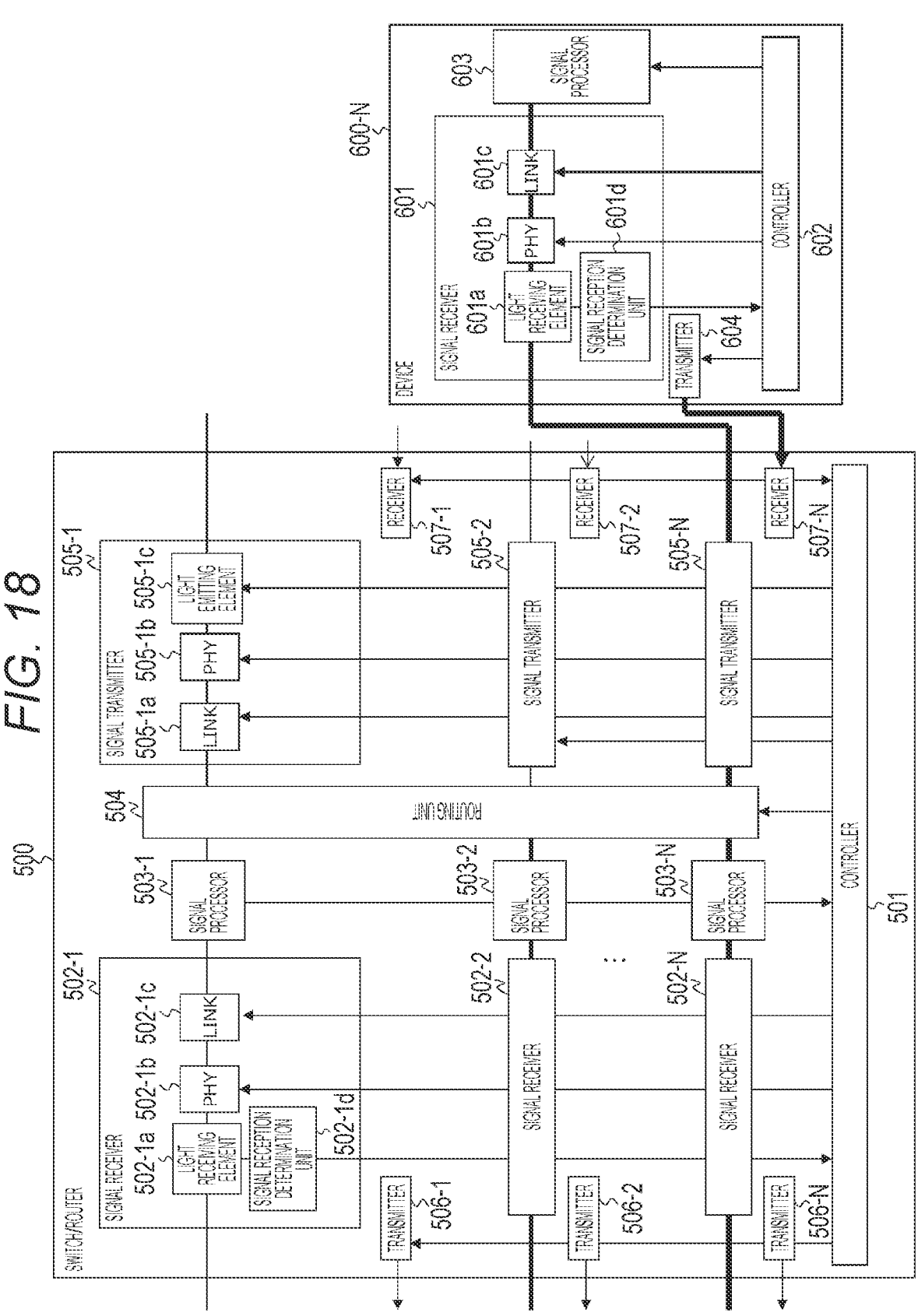
FIG. 18 is a diagram illustrating a more specific configuration example of the reception-side device and the switch/router.

FIG. 18 illustrates a more specific configuration example of the switch/router 500 and the device 600-N. Note that the devices 600-1 to 600-(N−1) are not illustrated but are similar in configuration to the device 600-N. In FIG. 18, components corresponding to the components illustrated in FIGS. 12 and 17 will be denoted by the same reference numerals, and no detailed description will be given of such components as appropriate.

The device 600-N includes a controller 602 and a signal processor 603 in addition to the above-described signal receiver 601 and transmitter 604. The controller 602 controls how each component of the device 600-N operates. The signal receiver 601 receives the optical signal as described above. The signal processor 603 performs the reception processing on the main data signal received as described above.

A light receiving element 601a of the signal receiver 601 receives the optical signal transmitted from the signal transmitter 500-N of the switch/router 505. The optical signal includes the wake up signal and the main data signal in this order.

A signal reception determination unit 601d determines whether the wake up signal has been received on the basis of the signal output from the light receiving element 601a, and transmits a result of the determination to the controller 602. The controller 602 activates, on the basis of the result of determination that the wake up signal has been received, the reception processor (a PHY unit 601b, a LINK unit 601c) of the signal receiver 601, and the signal processor 603 that are in the standby state.

As described above, after the reception processor (the PHY unit 601b, the LINK unit 601c) of the signal receiver 601 and the signal processor 603 are activated to start up the circuit on the basis of the reception of the wake up signal, the transmitter 604 transmits the ready notification to the receiver 507-N of the switch/router 500 under the control of the controller 602.

The receiver 507-N of the switch/router 500 notifies the controller 501 that the ready notification has been received. The controller 501 controls the signal transmitter 505-N on the basis of this notification to stop the transmission of the wake up signal and start to transmit the main data signal.

As described above, at the start of the transmission of the main data signal from the signal transmitter 505-N to the signal receiver 601 of the device 600-N, the reception processor (the PHY unit 601*b*, the LINK unit 601*c*) of the signal receiver 601 and the signal processor 603 are already active, and the circuit is in operation. This allows the device 600-N to appropriately receive and process the main data signal transmitted from the signal transmitter 505-N.

4. Fourth Embodiment

In the first to third embodiments described above, only one path, for example, the shortest path connecting the transmission-side device and the reception-side device is made active on the basis of the path information output from the transmission-side device after the wake up signal. It is, however, conceivable that a different path has better performance (possible transfer rate or latency) depending on the capability of the switch/router. In this case, it is possible to determine an optimum path by making a plurality of paths active for comparison at the time of establishing a connection between the transmission-side device and the reception-side device (path construction phase).

"Configuration Example of Transmission-Side Device and Switch/Router Connected to Transmission-Side Device"

Figure 19:
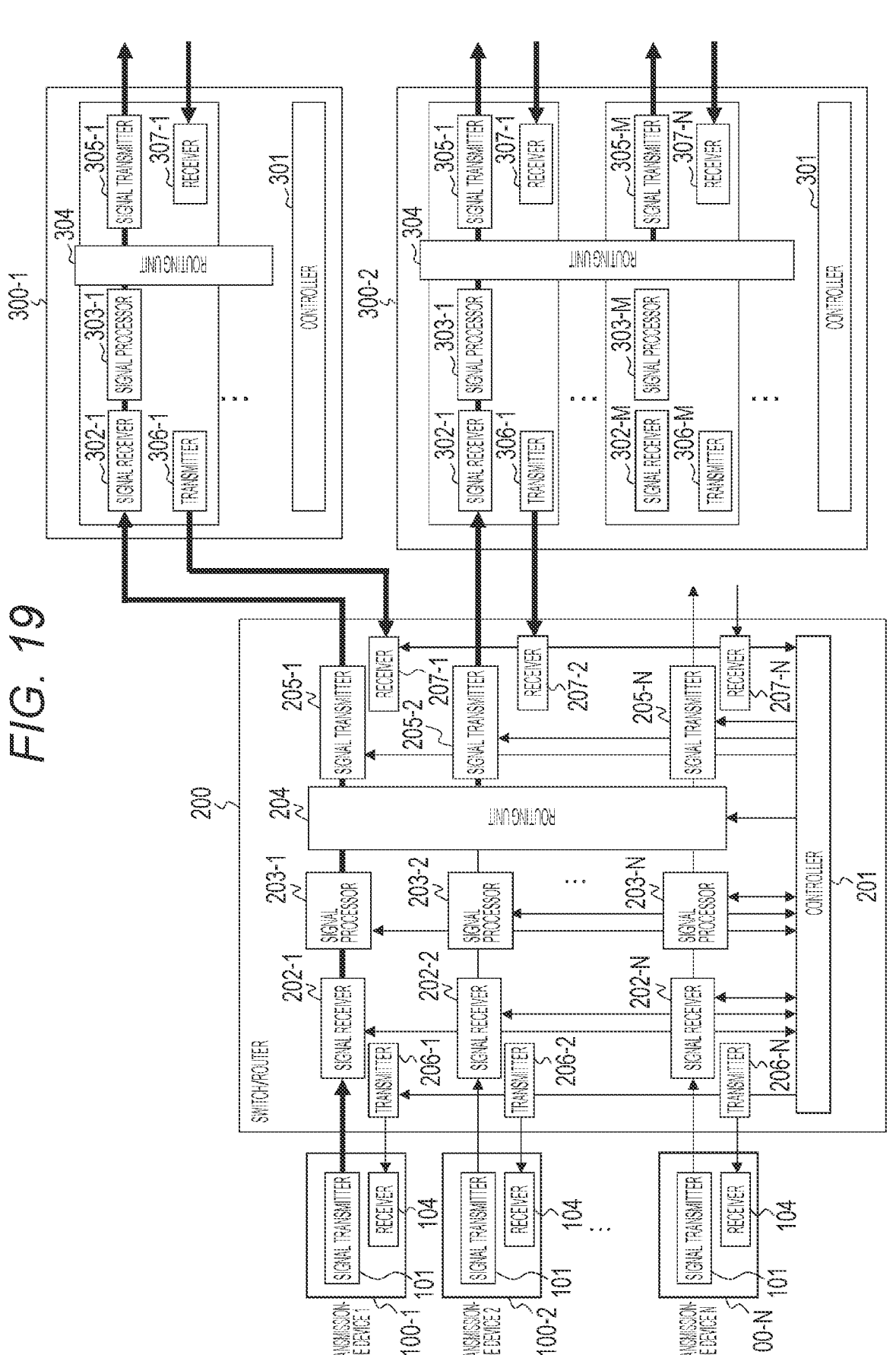
FIG. 19 is a diagram illustrating a configuration example of a transmission-side device and a switch/router as a relay device connected to the transmission-side device in a case where a new network system as a fourth embodiment is applied.

FIG. 19 illustrates a configuration example of a transmission-side device (transmission device) and a switch/router as a relay device connected to the transmission-side device in a case where a new network system as a fourth embodiment is applied. This configuration example corresponds to the transmission-side device, the switch/router constituting a medium-scale network, and the switch/router constituting a large-scale network enclosed by the dashed-line frame P in the network system illustrated in FIG. 5. In FIG. 19, components corresponding to the components illustrated in FIG. 8 will be denoted by the same reference numerals, and no detailed description will be given of such components as appropriate.

In the configuration example illustrated in FIG. 19, N devices 100-1, 100-2, . . . , and 100-N are transmission-side devices belonging to different users. Each device includes a signal transmitter 101 that transmits an optical signal and a receiver 104. Here, the optical signal output from the signal transmitter 101 includes a wake up signal, path information, and a main data signal in this order. The path information includes information regarding the reception-side device rather than information regarding one path connecting the transmission-side device and the reception-side device as in the first to third embodiments.

After the path information is transmitted after the wake up signal, the receiver 104 receives the ready notification from a corresponding transmitter of the switch/router 200. After the switch/router 200 receives a return signal transmitted from the reception-side device through the path made active on the basis of the path information, the corresponding transmitter of the switch/router 200 transmits the ready notification to the receiver 104. Accordingly, in a data transmission phase, the signal transmitter 101 starts to transmit the main data signal after the receiver 104 receives the ready notification.

Furthermore, in the configuration example illustrated in FIG. 19, the switch/router 200 is a switch/router constituting a medium-scale network. The switch/router 200 includes a controller 201, N signal receivers 202-1, 202-2, . . . , and 202-N, N signal processors 203-1, 203-2, . . . , and 203-N, a routing unit 204, N signal transmitters 205-1, 205-2, . . . , and 205-N, N transmitters 206-1, 206-2, . . . , and 206-N respectively corresponding to the signal receivers 202-1, 202-2, . . . , and 202-N, and N receivers 207-1, 207-2, . . . , and 207-N respectively corresponding to the signal receivers 205-1, 205-2, . . . , and 205-N.

The transmitters 206-1, 206-2, . . . , and 206-N each transmit the ready notification to a corresponding transmission-side device when, after a corresponding signal receiver receives the wake up signal, the reception processor of the corresponding signal receiver and the signal processor are activated to start up the circuit, the corresponding signal receiver receives the path information (information regarding the reception-side device), a plurality of paths is selected on the basis of the path information, and the circuit of the routing unit and the signal transmitter (target signal transmitter) corresponding to the selected path are activated to start up the circuit, a receiver corresponding to the activated target signal transmitter receives the return signal from the reception-side device.

Here, the signal processors 203-1, 203-2, . . . , and 203-N each select a path on the basis of the information regarding the reception-side device included in the path information by the following first method or second method, for example.

First Method

The signal processor determines a plurality of paths up to the reception-side device using the information regarding the reception-side device included in the path information. Then, the signal processor selects a plurality of shorter paths from among the plurality of paths.

Second Method

The signal processor determines a plurality of paths up to the reception-side device using the information regarding the reception-side device included in the path information. Then, the signal processor selects a plurality of paths from among the plurality of paths using the possible transfer rate and/or latency of the following switch/router as determination information.

In this case, the possible transfer rate or latency can be selectively used as the determination information in a manner that depends on what kind of application the main data signal transmitted from the transmission-side device to the reception-side device relates to. For example, in a case where the main data signal relates to a moving image reproduction application, the possible transfer rate is important, so that the possible transfer rate is used as the determination information. Furthermore, for example, in a case where the main data signal relates to a game application, the latency is important, so that the latency is used as the determination information.

For example, in a case where the possible transfer rate is used as the determination information, the signal processor selects all paths on which the possible transfer rate of the following switch/router is higher than or equal to a threshold, a plurality of paths having higher possible transfer rates, or a plurality of paths having lower possible transfer rates selected from paths having possible transfer rates higher than or equal to the threshold in order to avoid overperformance. Furthermore, for example, in a case where the latency is used as the determination information, the signal processor selects all paths on which the following switch/router has latency less than or equal to a threshold, or a plurality of paths having lower latency.

Furthermore, for example, in a case where both the possible transfer rate and the latency are used as the determination information, the signal processor selects all or some paths on which the following switch/router has a possible transfer rate higher than or equal to a certain threshold and latency lower than or equal to the threshold.

The circuit of the routing unit 204 and the signal transmitter (target signal transmitter) corresponding to each of the plurality of paths selected by the signal processors 203-1, 203-2, . . . , and 203-N are activated to start up the circuit on the basis of the plurality of paths under the control of the controller 201 so as to change from the standby state to the active state. Then, the target signal transmitter brought into the active state transmits the wake up signal and the path information to the following switch/router.

In this case, the target signal transmitter adds information regarding its own switch/router and information regarding a possible transfer rate and latency of its own switch/router to the path information to be transmitted. Here, in a case where a path is selected by the first method as described above, the path information to be transmitted corresponds to information regarding a path from the transmission-side device to the reception-side device. Furthermore, in a case where a path is selected by the second method as described above, the path information to be transmitted includes information from the transmission-side device to the reception-side device.

The receivers 207-1, 207-2, . . . , and 207-N each receive the return signal from the reception-side device transmitted as appropriate from a corresponding transmitter of the following switch/router after a corresponding signal transmitter stops the transmission of the path information.

The controller 201 maintains a circuit portion of the circuit of the routing unit 204 and the signal transmitter (target signal transmitter) that have been brought from the standby state into the active state as described above corresponding to the path selected by each of the signal processors 203-1, 203-2, . . . , and 203-N in the active state, the circuit portion corresponding to a path recognized to be in use, and brings a circuit portion corresponding to a path recognized to be in non-use back from the active state into the standby state.

The controller 201 recognizes whether a path is in use or non-use in accordance with a mode of transmission of the return signal from the reception-side device on a plurality of active paths as follows.

"Recognition in a Case of First Mode"

In the first mode, the return signal is transmitted from the reception-side device through a path selected from among a plurality of active paths. In this case, the controller 201 recognizes that the path through which the return signal is transmitted from the reception-side device is in use, and recognizes that paths through which no return signal is transmitted from the reception device during a certain period is in non-use.

"Recognition in a Case of Second Mode"

In the second mode, the reception-side device transmits a return signal including information indicating in-use through a path selected from among a plurality of active paths and transmits a return signal including information indicating non-use through an unselected path. In this case, the controller 201 recognizes that a path through which the return signal including information indicating in-use is transmitted from the reception-side device is in use, and recognizes that a path through which the return signal including information indicating non-use is transmitted from the reception-side device is in non-use.

"Recognition in a Case of Third Mode"

In the third mode, a return signal including in-use path information is transmitted from the reception-side device through a plurality of active paths. In this case, the controller 201 recognizes that a path through which the return signal is transmitted from the reception device and that coincides with a path indicated by the in-use path information included in the return signal is in use, and recognizes that a path through which the return signal is transmitted from the reception-side device and that does not coincide with the path indicated by the in-use path information included in the return signal is in non-use.

Although no detailed description will be given, the rest of the switch/router 200 is similar in configuration to the switch/router 200 illustrated in FIG. 8.

Furthermore, in the configuration example illustrated in FIG. 19, switches/routers 300-1, 300-2 are each a switch/router constituting a large-scale network. The switches/routers 300-1, 300-2 each include a controller 301, signal receivers 302-1, . . . , 302-M, signal processors 303-1, . . . , 303-M, . . . a routing unit 304, signal transmitters 305-1, . . . , 305-M, . . . transmitters 306-1, . . . , 306-M, . . . respectively corresponding to the signal receivers 302-1, . . . , 302-M, . . . , and receivers 307-1, . . . , 307-M, . . . respectively corresponding to the signal receivers 305-1, . . . , 305-M, . . . .

Each of the switches/routers 300-1, 300-2 is similar in configuration to the above-described switch/router 200.

The signal processors 303-1, . . . , 303-M, . . . each select a path on the basis of the path information received after the wake up signal by a corresponding one of the signal receivers 302-1, . . . , 302-M, . . . . Here, in a case where information regarding a path up to the reception-side device is included as the path information, one path is selected on the basis of the path information. On the other hand, in a case where information regarding the reception-side device is included as the path information, a plurality of paths is selected on the basis of the first method or the second method described above. Note that, in a case where there is only one path up to the reception-side device, only the one path is selected.

The controller 301 brings, on the basis of the path selected by the signal processors 303-1, . . . , 303-M, . . . , a circuit of the routing unit 204 and a signal transmitter (target signal transmitter) corresponding to the path from the standby state into the active state. Then, the target signal transmitter brought into the active state transmits the wake up signal and the path information to the following switch/router.

The path information to be transmitted corresponds to, in a case where one path is selected on the basis of information regarding to a path up to the reception-side device, and the path is selected by the first method described above on the basis of the information regarding the reception-side device, the information regarding the path from the transmission-side device to the reception-side device, and corresponds to, in a case where a path is selected by the second method described above on the basis of the information regarding the reception-side device, the information regarding the reception-side device.

In this case, the target signal transmitter adds information regarding its own switch/router and information regarding a possible transfer rate and latency of its own switch/router to the path information to be transmitted. Note that, in this case, the target signal transmitter further adds, as they are, information regarding the transmission-side device and the other switches/routers already included in the path information received by the signal receivers 302-1, . . . , 302-M, . . . , and information regarding the possible transfer rate and latency of each of the switches/routers.

The receivers 307-1, . . . , 307-M, . . . each receive the return signal of the reception-side device transmitted as appropriate from a corresponding transmitter of the following switch/router after a corresponding one of the signal transmitters 305-1, . . . , 305-M, . . . stops the transmission of the path information.

The controller 301 maintains a circuit portion of the circuit of the routing unit 204 and the signal transmitter (target signal transmitter) brought from the standby state into the active state as described above corresponding to the path selected by each of the signal processors 303-1, . . . , 303-M, . . . in the active state, the circuit portion corresponding to a path recognized to be in use, and brings a circuit portion corresponding to a path recognized to be in non-use back from the active state into the standby state.

The transmitters 306-1, . . . , 306-M, . . . each transmit the ready notification to the preceding switch/router when the circuit of the routing unit and the signal transmitter (target signal transmitter) corresponding to the path selected by a corresponding signal processor are activated to start up the circuit, and then a receiver corresponding to the activated target signal transmitter receives the return signal from the reception-side device.

Figure 20:
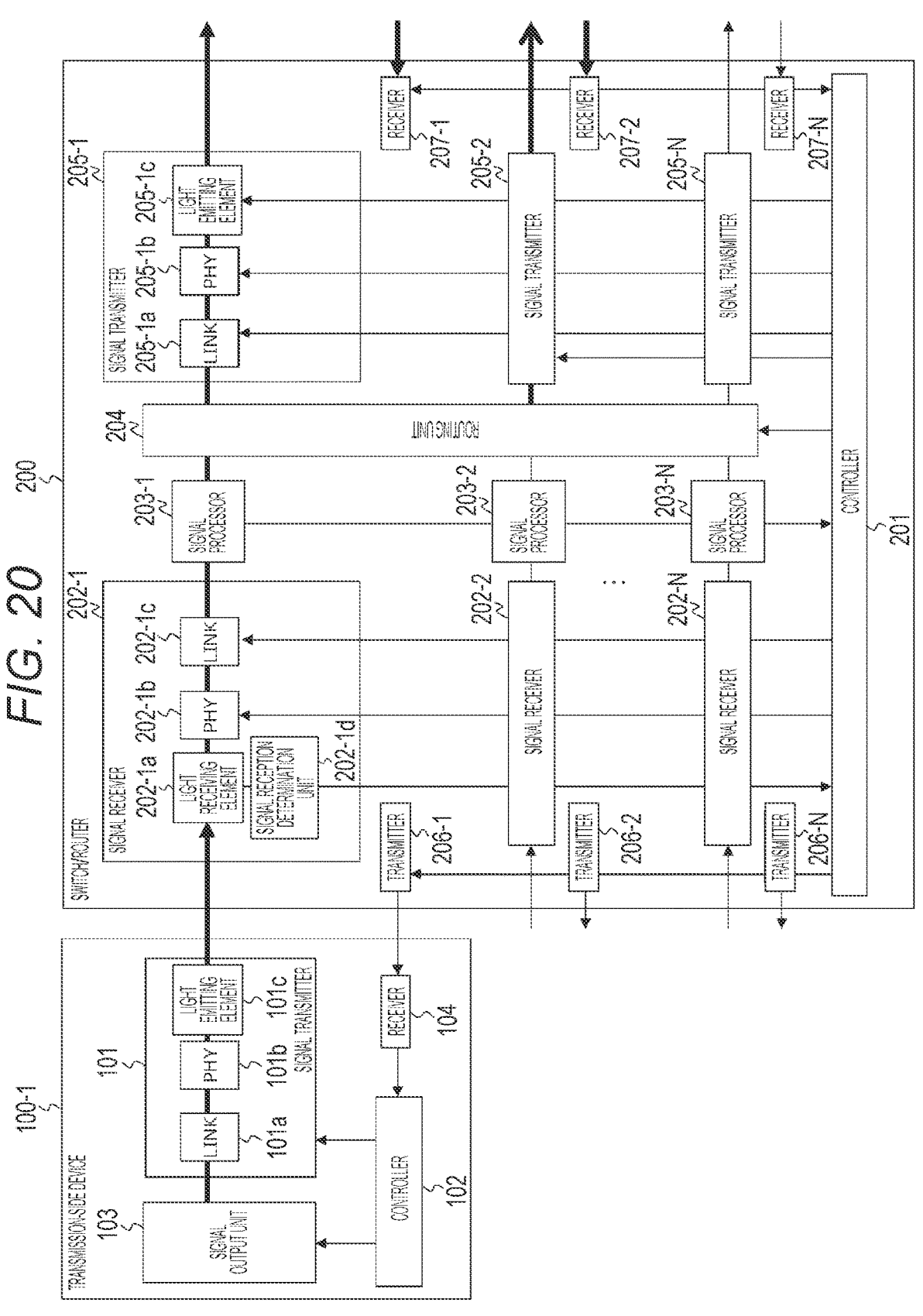
FIG. 20 is a diagram illustrating a more specific configuration example of the transmission-side device and the switch/router.

FIG. 20 illustrates a more specific configuration example of the device 100-1 and the switch/router 200 illustrated in FIG. 19. Note that the devices 100-2 to 100-N are not illustrated but are similar in configuration to the device 100-1. In FIG. 20, components corresponding to the components illustrated in FIGS. 9 and 19 will be denoted by the same reference numerals, and no detailed description will be given of such components as appropriate.

The device 100-1 includes a controller 102 and a signal output unit 103 in addition to the above-described signal transmitter 101 and the receiver 104. The controller 102 controls how each component of the device 101-1 operates. The signal output unit 103 outputs a signal to be transmitted to the switch/router 200. This signal includes the wake up signal, the path information, and the main data signal in this order.

The signal transmitter 101 transmits the optical signal as described above. The signal transmitter 101 includes a LINK unit 101a, a PHY unit 101b, and a light emitting element 101c. The LINK unit 101a and the PHY unit 101b perform transmission processing on the signal output from the signal output unit 103. The LINK unit 101a and the PHY unit 101b constitute a transmission processor.

The light emitting element 101c converts the signal output from the PHY unit 101b from an electrical signal into an optical signal and transmits the optical signal to the switch/router 200. The light emitting element 101c serves as a transmitter.

The receiver 104 receives, after the signal transmitter 101 starts to transmit the wake up signal and the path information to the signal receiver 202-1 of the switch/router 200, the ready notification transmitted from the transmitter 206-1 corresponding to the signal receiver 202-1. In this case, the transmitters 206-1 transmits this ready notification under the control of the controller 201 when the circuit of the routing unit 204 and the signal transmitter (target signal transmitter) corresponding to the path selected by the signal processor 203-1 are activated to start up the circuit, and then a receiver corresponding to the activated target signal transmitter receives the return signal from the reception-side device.

The receiver 104 notifies the controller 102 that the ready notification has been received. The controller 102 controls the signal output unit 103 on the basis of this notification to start to output the main data signal. This causes the signal transmitter 101 to start to transmit the main data signal.

The signal receiver 202-1 of the switch/router 200 receives the optical signal transmitted from the device 100-1 as described above. The signal receiver 202-1 includes a light receiving element 202-1a, a PHY unit 202-1b, a LINK unit 202-1c, and a signal reception determination unit 202-1d. The light receiving element 202-1a receives the optical signal transmitted from the device 100-1 and converts the optical signal into an electrical signal. The light receiving element 202-1a serves as a receiver.

The PHY unit 202-1b and the LINK unit 202-1c perform reception processing on the signal output from the light receiving element 202-1a and transmit the signal to the signal processor 203-1. The PHY unit 202-1b and the LINK unit 202-1c constitute a reception processor. The signal reception determination unit 202-1d determines whether the wake up signal has been received on the basis of the signal output from the light receiving element 202-1a, and transmits a result of the determination to the controller 201.

The controller 201 activates, on the basis of the result of determination that the wake up signal has been received, the reception processor (the PHY unit, the LINK unit) of the signal receiver 202-1 and the signal processor 203-1 to bring the reception processor and the signal processor 203-1 from the standby state into the active state.

Furthermore, the signal processor 203-1 thus activated selects a plurality of paths on the basis of the path information next to the wake up signal in the signal output from the signal receiver 202-1, and transmits a result of the selection to the controller 201. The controller 201 activates, on the basis of the paths selected by the signal processor 203-1, the circuit of the routing unit 204 and the signal transmitter (target signal transmitter) corresponding to each of the paths to bring the circuit and the signal transmitter from the standby state into the active state.

Furthermore, when the circuit of the routing unit 204 and the signal transmitter (target signal transmitter) corresponding to each of the paths selected by the signal processor 203-1 are brought into the active state, and then the receiver corresponding to the target signal transmitter receives the return signal from the reception-side device from the following switch/router, the controller 201 controls the transmitter 206-1 corresponding to the signal receiver 202-1 to transmit the ready notification to the receiver 104 of the device 100-1.

Although no detailed description will be given, the signal receivers 202-2 to 202-N of the switch/router 200 are similar in configuration to the signal receiver 202-1, and the transmitters 206-2 to 206-N are similar in configuration to the transmitter 206-1.

Furthermore, the signal transmitter 205-1 of the switch/router 200 includes a LINK unit 205-1a, a PHY unit 205-1b, and a light emitting element 205-1c. The LINK unit 205-1a and the PHY unit 205-1b perform transmission processing on a transmission signal. The LINK unit 205-1a and the PHY unit 205-1b constitute a transmission processor.

The light emitting element 205-1c converts the transmission signal output from the PHY unit 205-1b from an electrical signal into an optical signal and transmits the optical signal to the following device. The light emitting element 205-1c serves as a transmitter. Here, the transmission signal includes the wake up signal and the path information in this order in the path construction phase, and includes the main data signal in the subsequent data transmission phase.

In the path construction phase, the receiver 207-1 receives, as appropriate, the return signal from the reception-side device transmitted from a corresponding transmitter of a switch/router after the signal transmitter 205-1 transmits the wake up signal and the path information. The receiver 207-1 notifies the controller 201 that the return signal has been received. The controller 201 controls a corresponding transmitter on the basis of this notification to transmit the ready notification to a corresponding device.

Although no detailed description will be given, the signal transmitters 205-2 to 205-N of the switch/router 200 are similar in configuration to the signal transmitter 205-1, and the receivers 207-2 to 207-N are similar in configuration to the receiver 207-1.

Note that, in FIGS. 19 and 20, a thick arrow indicates an example of a signal flow in the path construction phase. In this case, the signal directed toward the reception-side device is the wake up signal and the path information, and the signal directed toward the transmission-side device is the return signal from the reception-side device.

For example, in the example configuration illustrated in FIG. 19, the wake up signal and the path information transmitted from the device 100-1 are received by the signal receiver 202-1 of the switch/router 200, and the wake up signal and the path information output from each of the signal transmitter 205-1, 205-2 of the switch/router 200 is transmitted to a corresponding one of the signal receivers 302-1, 302-2 of the switches/routers 300-1, 300-2.

The wake up signal and the path information output from the signal transmitter 305-1 of the switch/router 300-1 are then transmitted to the following device. Furthermore, the wake up signal and the path information output from each of the signal transmitters 305-1, 305-M of the switch/router 300-2 are transmitted to the following device.

Furthermore, the return signal from the reception-side device is transmitted toward the transmission-side device 100-1 in a direction opposite to the above-described transmission path.

Figure 21:
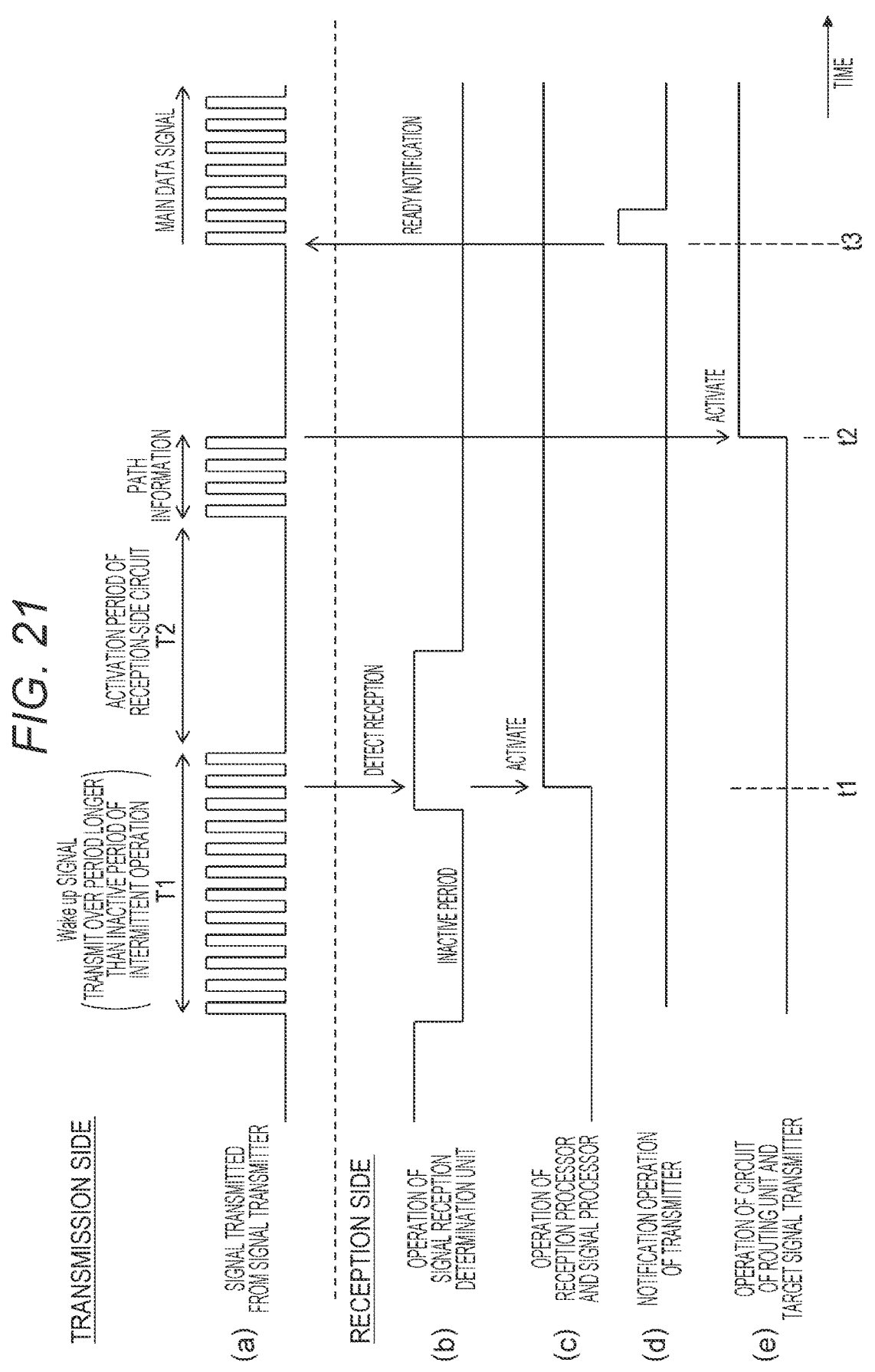
FIG. 21 is a timing chart for describing how the transmission-side device and the switch/router operate.

FIG. 21 is a timing chart for describing how the transmission-side device and the switch/router, here, the device 100-1 and the switch/router 200 in the configuration example illustrated in FIG. 20, operate. FIG. 21(a) illustrates a transmission signal transmitted from the device 100-1 to the signal receiver 202-1 of the switch/router 200. The transmission signal includes the wake up signal, the path information, and the main data signal in this order.

FIG. 21(b) illustrates how the signal reception determination unit 202-1d operates in the signal receiver 202-1 of the switch router 200 that receives the transmission signal from the device 100-1. Here, the signal reception determination unit 202-1d operates in an intermittent manner so as to reduce power consumption.

FIG. 21(c) illustrates how the reception processor (the PHY unit 202-1b, the LINK unit 202-1c) of the signal receiver 202-1 and the signal processor 203-1 operate. The reception processor (the PHY unit 202-1b, the LINK unit 202-1c) and the signal processor 203-1 are activated under the control of the controller 201 at timing t1 when the reception of the wake up signal is detected by the signal reception determination unit 202-1d.

FIG. 21(e) illustrates how the circuit of the routing unit 204 and the signal transmitter (target signal transmitter) corresponding to the path selected by the signal processor 203-1 on the basis of the path information operate. The circuit of the routing unit 204 and the target signal transmitter are activated under the control of the controller 201 at timing t2 when the path is selected by the signal processor 203-1.

FIG. 21(d) illustrates how the transmitter 206-1 corresponding to the signal receiver 202-1 of the switch/router 200 makes the ready notification. The transmitter 206-1 transmits the ready notification to the receiver 104 of the device 100-1 under the control of the controller 201 at timing t3 when the receiver corresponding to the target signal transmitter receives the return signal from the reception-side device transmitted from the following switch/router after the target signal transmitter corresponding to the path selected by the signal processor 203-1 is brought into the active state. The device 100-1 starts to transmit the main data signal at this timing t3.

Furthermore, although FIG. 21 illustrates how the transmission-side device and the switch/router operate connected to the transmission-side device operate, the same applies to a certain switch/router and the following switch/router connected to the certain switch/router. Note that the main data signal is transmitted from the transmission-side device to the reception-side device only through a path that has been determined to be in use and maintained in the active state. "Configuration Example of Reception-Side Device and Switch/Router Connected to Reception-Side Device"

Figure 22:
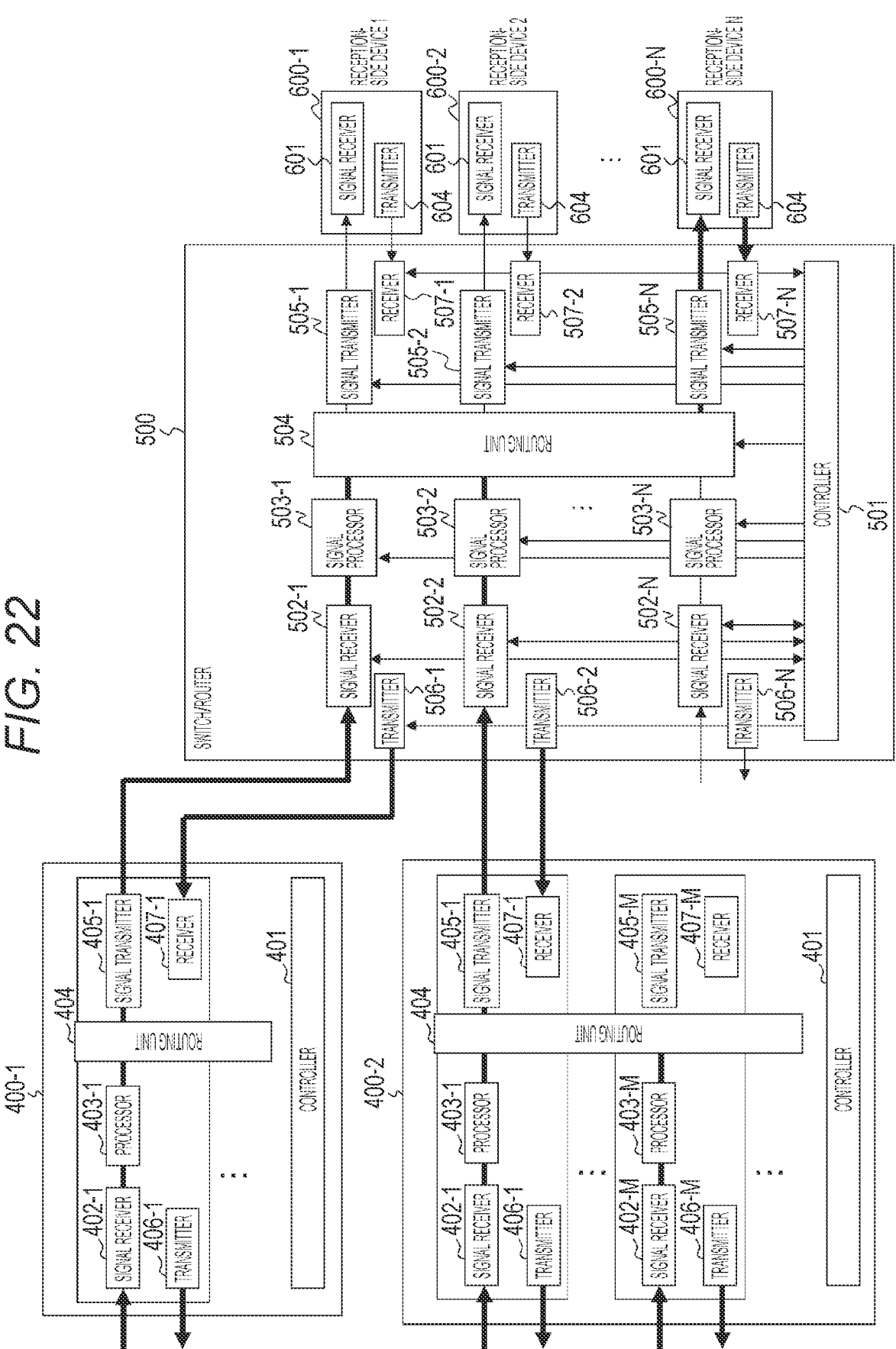
FIG. 22 is a diagram illustrating a configuration example of a reception-side device and a switch/router as a relay device connected to the reception-side device in a case where the new network system as the fourth embodiment is applied.

FIG. 22 illustrates a configuration example of a reception-side device (reception device) and a switch/router as a relay device connected to the reception-side device in a case where the new network system as the fourth embodiment is applied. This configuration example corresponds to the switch/router constituting a large-scale network, the switch/router constituting a medium-scale network, and the reception-side device enclosed by the dashed-line frame Q in the network system illustrated in FIG. 5. In FIG. 22, components corresponding to the components illustrated in FIG. 11 will be denoted by the same reference numerals, and no detailed description will be given of such components as appropriate.

In the configuration example illustrated in FIG. 22, switches/routers 400-1, 400-2 are each a switch/router constituting a large-scale network. The switches/routers 400-1, 400-2 each include a controller 401, signal receivers 402-1, . . . , 402-M, . . . signal processors 403-1, . . . , 403-M, . . . a routing unit 404, signal transmitters 405-1, . . . , 405-M, . . . transmitters 406-1, . . . , 406-M, . . . respectively corresponding to the signal receivers 402-1, . . . , 402-M, . . . and receivers 407-1, . . . , 407-M, . . . respectively corresponding to the signal receivers 405-1, . . . , 405-M, . . . .

Each of the switches/routers 400-1, 400-2 is similar in configuration to the switches/routers 300-1, 300-2, and the like illustrated in FIG. 19, so that no detailed description will be given of the switches/routers 400-1, 400-2. Note that the signal receivers 402-1, . . . , 402-M, . . . each receive the optical signal transmitted from another switch/router constituting a medium-scale network or a large-scale network.

Furthermore, in the configuration example illustrated in FIG. 22, a switch/router 500 is a switch/router constituting a medium-scale network. The switch/router 500 includes a controller 501, N signal receivers 502-1, 502-2, . . . , and 502-N, N signal processors 503-1, 503-2, . . . , and 503-N, a routing unit 504, N signal transmitters 505-1, 505-2, . . . , and 505-N, N transmitters 506-1, 506-2, . . . , and 506-N respectively corresponding to the signal receivers 502-1, 502-2, . . . , and 502-N, and N receivers 507-1, 507-2, . . . , and 507-N respectively corresponding to the signal receivers 505-1, 505-2, . . . , and 505-N.

The switch/router 500 is similar in configuration to the above-described switch/router 200 illustrated in FIG. 19, so that no detailed description will be given of the switch/router 500. Note that the signal receivers 502-1, 502-2, . . . , and 502-N each receive the optical signal transmitted from another switch/router constituting a medium-scale network or a large-scale network.

Furthermore, in the configuration example illustrated in FIG. 22, N devices 600-1, 600-2, . . . , and 600-N are reception-side devices belonging to different users. Each device includes a signal receiver 601 that receives an optical signal and a transmitter 604 that transmits a return signal to a corresponding receiver of the switch/router 500.

A description will be given below of the device 600-1. In a case where when the transmission-side device outputs the wake up signal and the path information as described above to sequentially bring necessary circuit portions of the plurality of switches/routers from the standby state into the active state, and a plurality of paths is set, the signal receiver 601 of the device 600-1 receives the wake up signal and the path information regarding the plurality of paths from a corresponding signal transmitter.

The device 600-1 activates, on the basis of the wake up signal received by the signal receiver 601, a reception processor included in the signal receiver 601, a signal processor that processes the path information regarding the plurality of paths and the main data signal received by the signal receiver 601, and the like.

Furthermore, the device 600-1 selects any one of the plurality of paths set as described above, for example, on the basis of the path information regarding the plurality of paths. That is, the path information regarding the plurality of paths includes possible transfers rate and latencies of a predetermined number of switches/routers constituting each path, thereby allowing a path to be selected on the basis of information regarding the possible transfer rates and/or the latencies.

FIG. 23 is a diagram illustrating an example of processing of selecting one path from among a plurality of paths. This example shows a case where three paths are set. A to J denote switches/routers. A first path extends from the transmission-side device to the reception-side device via A, B, H, J in this order, a second path extends from the transmission-side device to the reception-side device via A, E, F, J in this order, and a third path extends from the transmission-side device to the reception-side device via A, E, H, J in this order.

Here, it is assumed that the possible transfer rates of the switches/routers A, B, E, F, H, J are denoted by Sa, Sb, Se, Sf, Sh, Sj, respectively. Furthermore, the latencies of the switches/routers A, B, E, F, H, J are denoted by Ls, Lb, Le, Lf, Lh, Lj, respectively.

In this case, for the first path, the possible transfer rate is denoted by S1 (lowest value among Sa, Sb, Sh, Sj), and the latency is denoted by L1 (=La+Lb+Lh+Lj). Furthermore, for the second path, the possible transfer rate is denoted by S2 (lowest value among Sa, Se, Sf, Sj), and the latency is denoted by L2 (=La+Le+Lf+Lj). Furthermore, for the third path, the possible transfer rate is denoted by S3 (lowest value among Sa, Se, Sh, Sj), and the latency is denoted by L3 (=La+Le+Lh+Lj).

For example, in a case where the main data signal relates to a moving image reproduction application, the possible transfer rate is important, so that the device 600-1 compares S1, S2, S3 to select a path corresponding to the highest value. Furthermore, for example, in a case where the main data signal relates to a game application, the latency is important, so that the device 600-1 compares L1, L2, L3 to select a path corresponding to the smallest value. Note that it is also conceivable that a path is selected on the basis of both the possible transfer rate and the latency rather than selecting a path on the basis of either one of the possible transfer rate and the latency.

As described above, the transmitter 604 of the device 600-1 transmits, after one path is selected, the return signal through some or all of the plurality of paths. The return signal is used for maintaining each circuit portion constituting the selected path in the active state and bringing each circuit portion constituting unselected paths back from the active state to the standby state. Furthermore, the return signal is also used for notifying the transmission-side device that the communication path is ready.

As described above, the return signal is transmitted in any one of the first mode, the second mode, or the third mode, for example. That is, in the first mode, the return signal is transmitted through a path selected from among the plurality of active paths. In the second mode, the return signal including information indicating in-use is transmitted through a path selected from among the plurality of active paths, and the return signal including information indicating non-use is transmitted through an unselected path. In the third mode, the return signal including in-use path information is transmitted through the plurality of active paths.

After the return signal is transmitted by the transmitter 604 as described above, the device 600-1 performs, on the main data signal received by the signal receiver 601, reception processing such as recording processing or display processing in a case where the main data signal is video data, or game control processing in a case where the main data signal is game control data, for example.

Although no detailed description will be given, each of the devices 600-2 to 600-N is similar in configuration to device 600-1.

Figure 24:
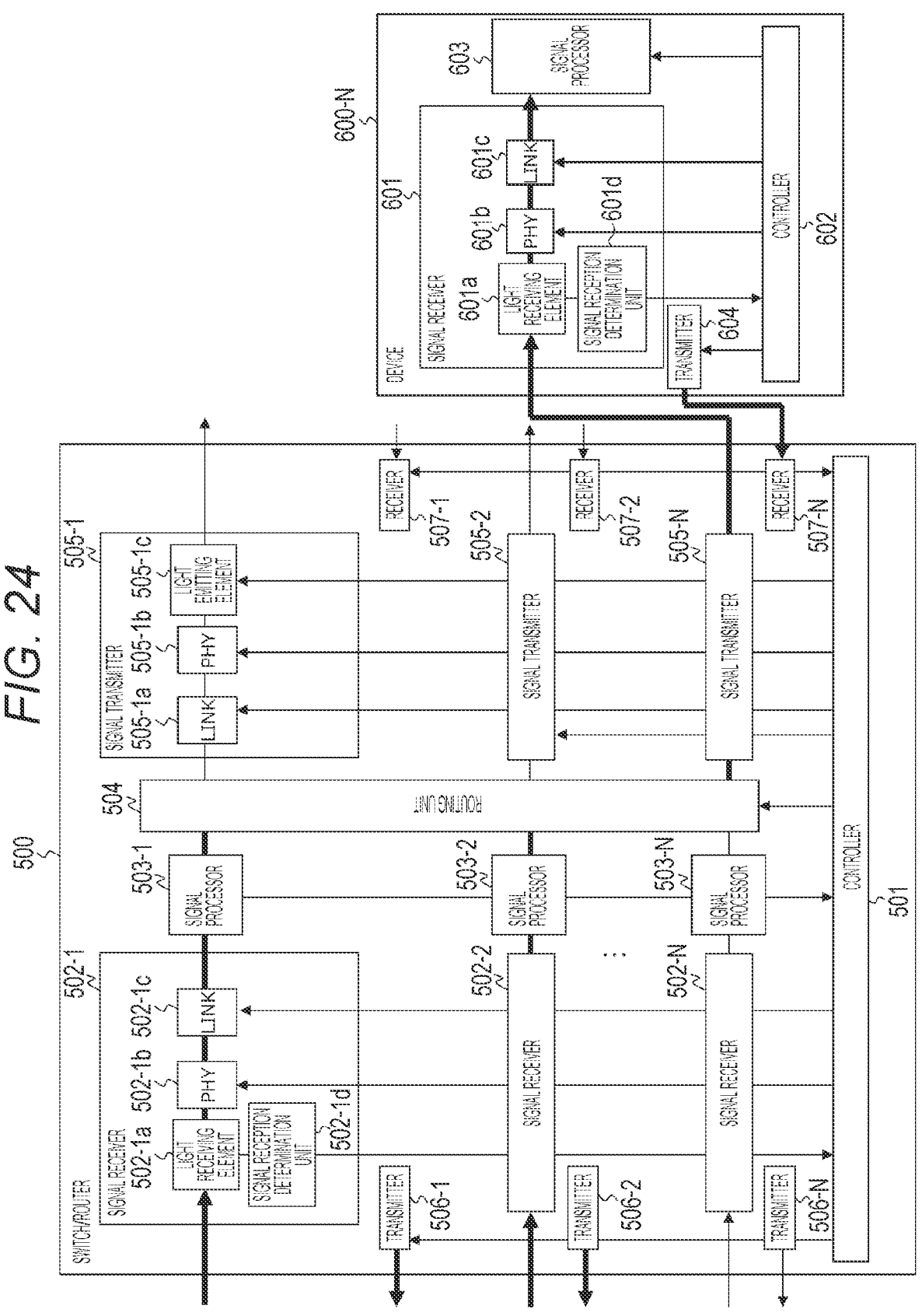
FIG. 24 is a diagram illustrating a more specific configuration example of the reception-side device and the switch/router.

FIG. 24 illustrates a more specific configuration example of the switch/router 500 and the device 600-N. Note that the devices 600-1 to 600-(N−1) are not illustrated but are similar in configuration to the device 600-N. In FIG. 24, components corresponding to the components illustrated in FIGS. 12 and 22 will be denoted by the same reference numerals, and no detailed description will be given of such components as appropriate.

The device 600-N includes a controller 602 and a signal processor 603 in addition to the above-described signal receiver 601 and transmitter 604. The controller 602 controls how each component of the device 600-N operates. The signal receiver 601 receives the optical signal as described above. The signal processor 603 performs various processing such as processing of acquiring path information regarding a plurality of paths received by the signal receiver 601 in the path construction phase or recording processing and reproduction processing on the main data signal received by the signal receiver 601 in the subsequent data transmission phase.

A light receiving element 601a of the signal receiver 601 receives the optical signal transmitted from the signal transmitter 500-N of the switch/router 505. The optical signal includes the path information regarding each of the plurality of set paths in addition to the wake up signal in the path construction phase.

A signal reception determination unit 601*d* determines whether the wake up signal has been received on the basis of the signal output from the light receiving element 601*a*, and transmits a result of the determination to the controller 602. The controller 602 activates, on the basis of the result of determination that the wake up signal has been received, the reception processor (a PHY unit 601*b*, a LINK unit 601*c*) of the signal receiver 601, and the signal processor 603 that are in the standby state.

The controller 602 selects, in the path construction phase, one path as described above on the basis of the path information regarding the plurality of paths acquired by the signal processor 603 from the signal processor 603. Then, after the one path is selected, the controller 602 controls the transmitter 604 of the device 600-1 to generate a return signal that passes through some or all of the plurality of paths and transmit the return signal to the receiver 507-N of the switch/router 500.

This return signal is used for maintaining each circuit portion constituting the selected path in the active state and bringing each circuit portion constituting unselected paths back from the active state to the standby state. Furthermore, the return signal is also used for notifying the transmission-side device that the communication path is ready.

In this case, the return signal passing through each path includes path information regarding the path and further includes information based on the transmission mode (any one of the first mode, the second mode, or the third mode described above) of the return signal.

Note that, in FIGS. 22 and 24, a thick arrow indicates an example of a signal flow in the path construction phase. In this case, the signal directed toward the reception-side device is the wake up signal and the path information, and the signal directed toward the transmission-side device is the return signal from the reception-side device.

For example, in the example configuration illustrated in FIG. 22, the signal receiver 402-1 of the switch/router 400-1 receives the wake up signal and the path information transmitted from a corresponding preceding device, and the signal receiver 502-1 of the switch/router 500 receives the wake up signal and the path information output from the signal transmitter 405-1 of the switch/router 400-1.

Furthermore, the signal receivers 402-1, 402-M of the switch/router 400-2 each receive the wake up signal and the path information transmitted from a corresponding preceding device, and the signal receiver 502-2 of the switch/router 500 receives the wake up signal and the path information output from the signal transmitter 405-1 of the switch/router 400-2.

Then, the signal receiver 601 of the reception-side device 600-N receives the wake up signal and the path information output from the signal transmitter 505-N of the switch/router 500.

Furthermore, the return signal from the reception-side device 600-N is transmitted toward the transmission-side device in a direction opposite to the above-described transmission path.

As described above, in the fourth embodiment, the wake up signal and the path information are output from the transmission-side device to set a plurality of active paths from the transmission-side device to the reception-side device, the reception-side device selects one path from among the plurality of active paths, then transmits the return signal to maintain the selected one path in the active state and bring the other paths back from the active state into the standby state, and notifies the transmission-side device of the ready notification, and the transmission-side device transmits the main data signal to the reception-side device through the selected one path on the basis of the notification. The fourth embodiment therefore allows the main data signal to be transmitted from the transmission-side device to the reception-side device using an optimum path.

5. Modification

Note that, in the above-described embodiments, the present technology is applied to an optical network system that transmits an optical signal, but the present technology is also applicable to a network system that transmits an electrical signal.

Furthermore, in the above-described embodiments, it is assumed that devices are connected over a network on a one-to-one basis, but when the devices are connected to an upper-level network, it is also assumed that a plurality of pieces of data are bundled in a time-division multiplexing manner, and it is also possible to transmit data with the routing unit provided with a multiplexer for the bundling.

Furthermore, the preferred embodiments of the present disclosure have been described in detail with reference to the accompanying drawings, but the technical scope of the present disclosure is not limited to such examples. It is obvious that those having ordinary skill in the art of the present disclosure can conceive various changes or modifications within the scope of the technical idea described in the claims, and it is to be understood that such changes or modifications also fall within the technical scope of the present disclosure.

Furthermore, the effects described herein are merely illustrative or exemplary, and should not be restrictively interpreted. That is, the technology according to the present disclosure can exhibit other effects that are obvious for those skilled in the art from the description given herein together with or instead of the above-described effects.

Furthermore, the present technology can also have the following configurations.

(1) A transmission device including:

a signal output unit that outputs a wake up signal, path information, and a main data signal in this order; and a signal transmitter that transmits a signal output from the signal output unit.

(2) In the transmission device according to the above (1), the signal output unit outputs the wake up signal over a period just longer than an inactive period of an intermittent operation of reception determination made by a device that receives the signal transmitted from the signal transmitter, and starts to output the path information at a predetermined interval after end of the output of the wake up signal.

(3) In the transmission device according to the above (1), the signal output unit stops outputting the wake up signal on the basis of a reception notification transmitted from a device that receives the signal transmitted from the signal transmitter after start of the output of the wake up signal, and then starts to output the path information.

(4) In the transmission device according to any one of the above (1) to (3), the signal output unit starts to output the main data signal at a predetermined interval after end of the output of the path information.

(5) In the transmission device according to any one of the above (1) to (3), the signal output unit starts to output, after end of the output of the path information, the main data signal on the basis of a ready notification transmitted from a device that receives the signal transmitted from the signal transmitter.

(6) A transmission method including:

outputting a wake up signal, path information, and a main data signal in this order; and transmitting the wake up signal, the path information, and the main data signal that have been output.

(7) A relay device including:

a signal receiver including a receiver that receives a wake up signal and path information in this order and a reception processor that processes a signal output from the receiver;

a plurality of signal transmitters;

a routing unit that selectively transmits a signal output from the reception processor of the signal receiver to a target signal transmitter, the target signal transmitter being any one of the plurality of signal transmitters;

a signal reception determination unit that determines whether the wake up signal has been received on the basis of the signal output from the receiver of the signal receiver;

a path selector that selects a path on the basis of the path information included in the signal output from the reception processor of the signal receiver; and a controller that performs control to activate the reception processor of the signal receiver and the path selector on the basis of a result of determination that the wake up signal has been received made by the signal reception determination unit, bring, on the basis of the path selected by the path selector, a circuit of the routing unit and the target signal transmitter corresponding to the path from a standby state into an active state, and cause the target signal transmitter brought into the active state to transmit the wake up signal and the path information in this order.

(8) In the relay device according to the above (7), the path selector selects one path indicated by the path information.

(9) In the relay device according to the above (7), the path selector selects a plurality of shorter paths from among a plurality of paths up to a reception device determined on the basis of information regarding the reception device included in the path information.

(10) In the relay device according to the above (7), the path selector selects, using a possible transfer rate and/or a latency of a following relay device as determination information, a plurality of paths from among a plurality of paths up to a reception device determined on the basis of information regarding the reception device included in the path information.

(11) In the relay device according to the above (10), the path selector selectively uses the possible transfer rate or the latency as the determination information in a manner that depends on what kind of application a main data signal transmitted from a transmission device to the reception device relates to.

(12) In the relay device according to any one of the above (7) to (11), when transmitting the wake up signal and the path information in this order, the target signal transmitter brought into the active state on the basis of the path selected by the path selector adds, to the path information, information regarding a relay device to which the target signal transmitter belongs and information regarding a possible transfer rate and a latency of the relay device.

(13) In the relay device according to any one of the above (7) to (12), the target signal transmitter outputs the wake up signal over a period just longer than an inactive period of an intermittent operation of reception determination made by a device that receives a signal transmitted from the target signal transmitter, and starts to output the path information at a predetermined interval after end of the output of the wake up signal.

(14) In the relay device according to any one of the above (7) to (12), the target signal transmitter stops outputting the wake up signal on the basis of a reception notification transmitted from a device that receives a signal transmitted from the target signal transmitter after start of the output of the wake up signal, and then starts to output the path information.

(15) In the relay device according to any one of the above (7) to (14), the target signal transmitter starts to output a main data signal included in the signal output from the reception processor of the signal receiver at a predetermined interval after end of the output of the path information.

(16) In the relay device according to any one of the above (7) to (14), the target signal transmitter starts to output, after end of the output of the path information, a main data signal included in the signal output from the reception processor of the signal receiver on the basis of a ready notification transmitted from a device that receives a signal transmitted from the target signal transmitter.

(17) The relay device according to any one of the above (7) to (16), further including a storage that temporarily stores a main data signal included in the signal output from the reception processor of the signal receiver.

(18) The relay device according to any one of the above (7) to (17), further including a notification transmitter that transmits a reception notification to a device that transmits a signal to the receiver of the signal receiver after the reception processor of the signal receiver and the path selector are activated to start up a circuit on the basis of the result of determination that the wake up signal has been received made by the signal reception determination unit.

(19) The relay device according to any one of the above (7) to (18), further including a notification transmitter that transmits a ready notification to a device that transmits a signal to the receiver of the signal receiver after the circuit of the routing unit and the target signal transmitter corresponding to the path selected by the path selector are activated to start up a circuit on the basis of the path.

(20) In the relay device according to any one of the above (7) to (19), the controller brings a circuit portion corresponding to a predetermined number of paths selected by the path selector from the standby state into the active state, and then maintains a circuit portion corresponding to a path recognized to be in use in the active state and brings a circuit portion corresponding to a path recognized to be in non-use back from the active state into the standby state.

(21) In the relay device according to the above (20), the controller recognizes that a path through which a return signal is transmitted from a reception device is in use, and recognizes that a path through which no return signal is transmitted from the reception device during a certain period is in non-use.

(22) In the relay device according to the above (20), the controller recognizes that a path through which a return signal including information indicating in-use is transmitted from a reception device is in use, and recognizes that a path through which a return signal including information indicating non-use is transmitted from the reception device is in non-use.

(23) In the relay device according to the above (20), the controller recognizes that a path through which a return signal is transmitted from a reception device and that coincides with a path indicated by in-use path information included in the return signal is in use, and recognizes that a path through which the return signal is transmitted from the reception device and that does not coincide with the path indicated by the in-use path information included in the return signal is in non-use.

(24) A method for controlling a relay device,
the relay device including
a signal receiver including a receiver that receives an optical signal including a wake up signal and path information in this order and a reception processor that processes a signal output from the receiver,
a plurality of signal transmitters,
a routing unit that selectively transmits a signal output from the reception processor of the signal receiver to a target signal transmitter, the target signal transmitter being any one of the plurality of signal transmitters,
a signal reception determination unit that determines whether the wake up signal has been received on the basis of the signal output from the receiver of the signal receiver, and
a path selector that selects a path on the basis of the path information included in the signal output from the reception processor of the signal receiver,
the method including performing control to:
activate the reception processor of the signal receiver and the path selector on the basis of a result of determination that the wake up signal has been received made by the signal reception determination unit;
bring, on the basis of the path selected by the path selector, a circuit of the routing unit and the target signal transmitter corresponding to the path from a standby state into an active state; and
cause the target signal transmitter brought into the active state to transmit the wake up signal and the path information in this order.

(25) A reception device including:
a signal receiver including a receiver that receives a wake up signal and a main data signal in this order, and a reception processor that processes a signal output from the receiver;
a signal processor that processes the main data signal included in the signal output from the signal receiver;
a signal reception determination unit that determines whether the wake up signal has been received on the basis of the signal output from the receiver of the signal receiver; and
a controller that performs control to activate the reception processor of the signal receiver and the signal processor on the basis of a result of determination that the wake up signal has been received made by the signal reception determination unit.

(26) The reception device according to the above (25), further including
a notification transmitter that transmits a ready notification to a device that transmits a signal to the signal receiver after the reception processor of the signal receiver and the signal processor are activated to start up a circuit on the basis of the result of determination that the wake up signal has been received made by the signal reception determination unit.

(27) The reception device according to the above (25), further including a path selector that selects, when the receiver of the signal receiver receives the wake up signal through a plurality of paths for establishing a connection to a transmission device, any one of the plurality of paths, in which
the controller further controls transmission processing of transmitting, through some or all of the plurality of paths, a return signal for maintaining each circuit portion constituting the path selected in an active state and bringing each circuit portion constituting an unselected path back from the active state into a standby state.

(28) In the reception device according to the above (27), the controller selects any one of the plurality of paths on the basis of information regarding possible transfer rates and/or latencies of a predetermined number of relay units constituting a path included in path information received by the receiver of the signal receiver after the wake up signal.

(29) In the reception device according to the above (27) or (28), in the transmission processing, the return signal is transmitted through the path selected.

(30) In the reception device according to the above (27) or (28), in the transmission processing, a return signal including information indicating in-use is transmitted through the path selected, and a return signal including information indicating non-use is transmitted through the unselected path.

(31) In the reception device according to the above (27) or (28), in the transmission processing, a return signal including in-use path information is transmitted through the plurality of paths.

(32) A method for controlling a reception device,
the reception device including
a signal receiver including a receiver that receives a wake up signal and a main data signal in this order, and a reception processor that processes a signal output from the receiver,
a signal processor that processes the main data signal included in a signal output from the signal receiver, and
a signal reception determination unit that determines whether the wake up signal has been received on the basis of the signal output from the receiver of the signal receiver,
the method including performing control to activate the reception processor of the signal receiver and the signal processor on the basis of a result of determination that the wake up signal has been received made by the signal reception determination unit.

(33) A network system including: a transmission device; a reception device; and a predetermined number of relay devices interposed between the transmission device and the reception device, in which
a wake up signal, path information, and a main data signal are transmitted in this order from the transmission device, and necessary circuits on a path from the transmission device to the reception device are sequentially activated to cause the reception device to receive the main data signal.

(34) In the network system according to the above (33), each of the relay devices is a switch/router.

REFERENCE SIGNS LIST 100-1, 100-2, . . . , 100-N Transmission-side device
101 Signal transmitter
101a LINK unit 101*b* PHY unit
101*c* Light emitting element
102 Controller
103 Signal output unit
104 Receiver
200 Switch/router
201 Controller
202-1, 202-2, . . . , 202-N Signal receiver
202-1*a* Light receiving element
202-1*b* PHY unit
202-1*c* LINK unit
202-1*d* Signal reception determination unit
203-1, 203-2, . . . , 203-N Signal processor
204 Routing unit
205-1, 205-2, . . . , 205-N Signal transmitter
205-1*a* LINK unit
205-1*b* PHY unit
205-1*c* Light emitting element
206-1, 206-1, . . . , 206-N Transmitter
207-1, 207-1, . . . , 207-N Receiver
208-1, 208-1, . . . , 208-N Memory
300, 300-1, 300-2, 400, 400-1, 400-2, 500 Switch/router
501 Controller
502-1, 502-2, . . . , 502-N Signal receiver
502-1*a* Light receiving element
502-1*b* PHY unit
502-1*c* LINK unit
502-1*d* Signal reception determination unit
503-1, 503-2, . . . , 503-N Signal processor
504 Routing unit
505-1, 505-2, . . . , 505-N Signal transmitter
505-1*a* LINK unit
505-1*b* PHY unit
505-1*c* Light emitting element
506-1, 506-1, . . . , 506-N Transmitter
507-1, 507-1, . . . , 507-N Receiver
600-1, 600-2, . . . , 600-N Reception-side device
601 Signal receiver
601*a* Light receiving element
601*b* PHY unit
601*c* LINK unit
601*d* Signal reception determination unit
602 Controller 603 Signal processor
604 Transmitter

The invention claimed is:

1. A transmission device comprising:
circuitry configured to
    output a wake up signal, path information, and a main data signal in this order; and
    transmit a signal output from the circuitry,
wherein the circuitry outputs the wake up signal over a period longer than an inactive period of an intermittent operation of reception determination made by a device configured to receive the signal transmitted from the circuitry.

2. The transmission device according to claim 1,
wherein the circuitry starts to output the path information at a predetermined interval after end of the output of the wake up signal.

3. The transmission device according to claim 1,
wherein the circuitry stops outputting the wake up signal based on a reception notification transmitted from a device that receives the signal transmitted from the circuitry after start of the output of the wake up signal, and then starts to output the path information.

4. The transmission device according to claim 1,
wherein the circuitry starts to output the main data signal at a predetermined interval after end of the output of the path information.

5. The transmission device according to claim 1,
wherein the circuitry starts to output, after end of the output of the path information, the main data signal based on a ready notification transmitted from a device that receives the signal transmitted from the circuitry.

6. A transmission method, executed by at least one processor, the method comprising:
outputting a wake up signal, path information, and a main data signal in this order; and
transmitting the wake up signal, the path information, and the main data signal that have been output,
wherein the wake up signal is output over a period longer than an inactive period of an intermittent operation of reception determination made by a device configured to receive the transmitted wake up signal.

* * * * *